United States Patent [11] 3,579,956

[72] Inventors Wolfgang Hoffmann
 Beaconsfield, Quebec;
 Paul Wick, Valois, Quebec, Canada
[21] Appl. No. 734,029
[22] Filed June 3, 1968
[45] Patented May 25, 1971
[73] Assignee Canadian International Paper Company
 Montreal, Quebec, Canada

[54] PACKAGING APPARATUS
 10 Claims, 25 Drawing Figs.
[52] U.S. Cl...................................................... 53/159,
 53/207
[51] Int. Cl...................................................... B65b 35/50
[50] Field of Search.......................................... 53/159,
 192, 194, 195, 207

[56] References Cited
 UNITED STATES PATENTS
 2,819,576  1/1958  Hendricks et al.............  53/159X
 3,482,372  12/1969  Hottendorf...................  53/207X
*Primary Examiner*—H. A. Kilby, Jr.
*Attorney*—Alan Swabey ABSTRACT: A wrapping apparatus whereby a commodity is wrapped from the bottom upwardly, the wrapping apparatus having wrapping-feeding means preferably with glue-applying means for placing glue on selected portions of the wrapper as the wrapper is fed. The commodity-feeding component for placing the commodities on the wrapper is either a one or two level device for placing single or double layers of commodities on the wrapper.

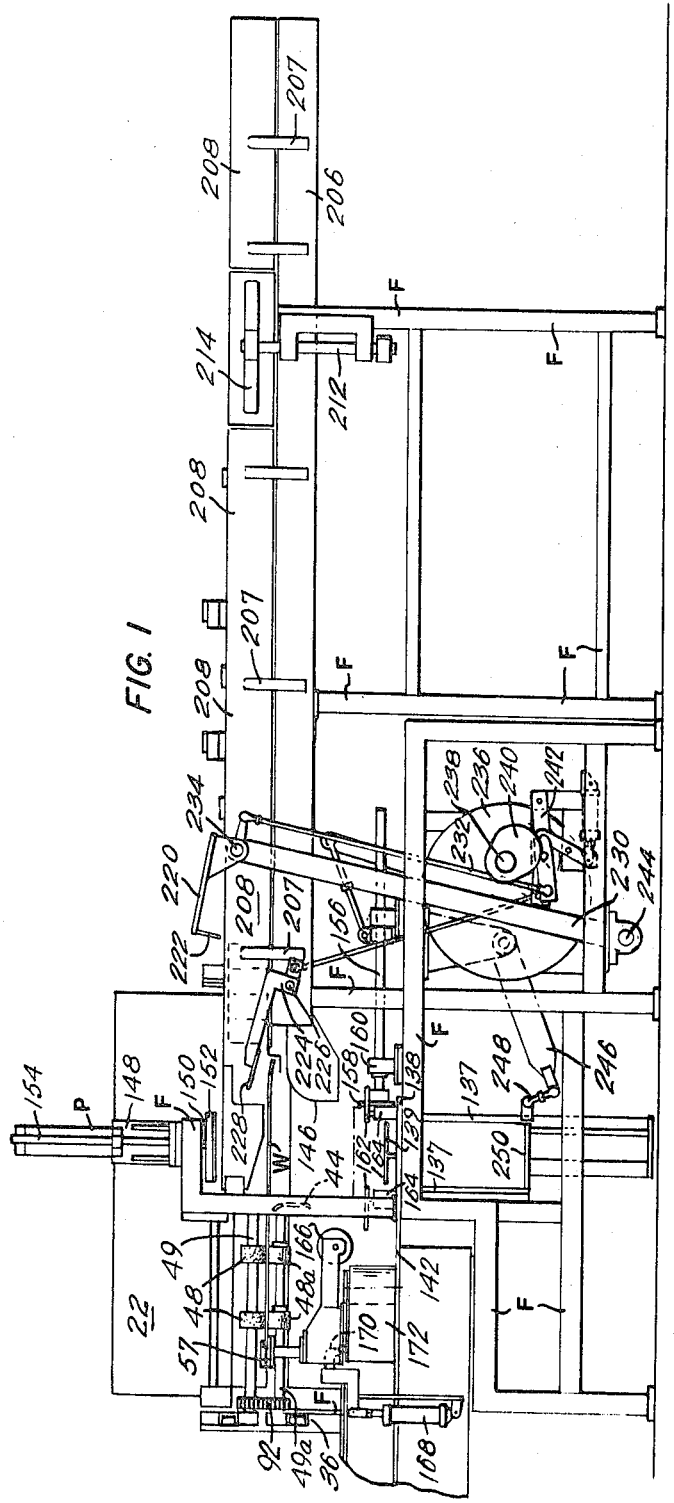

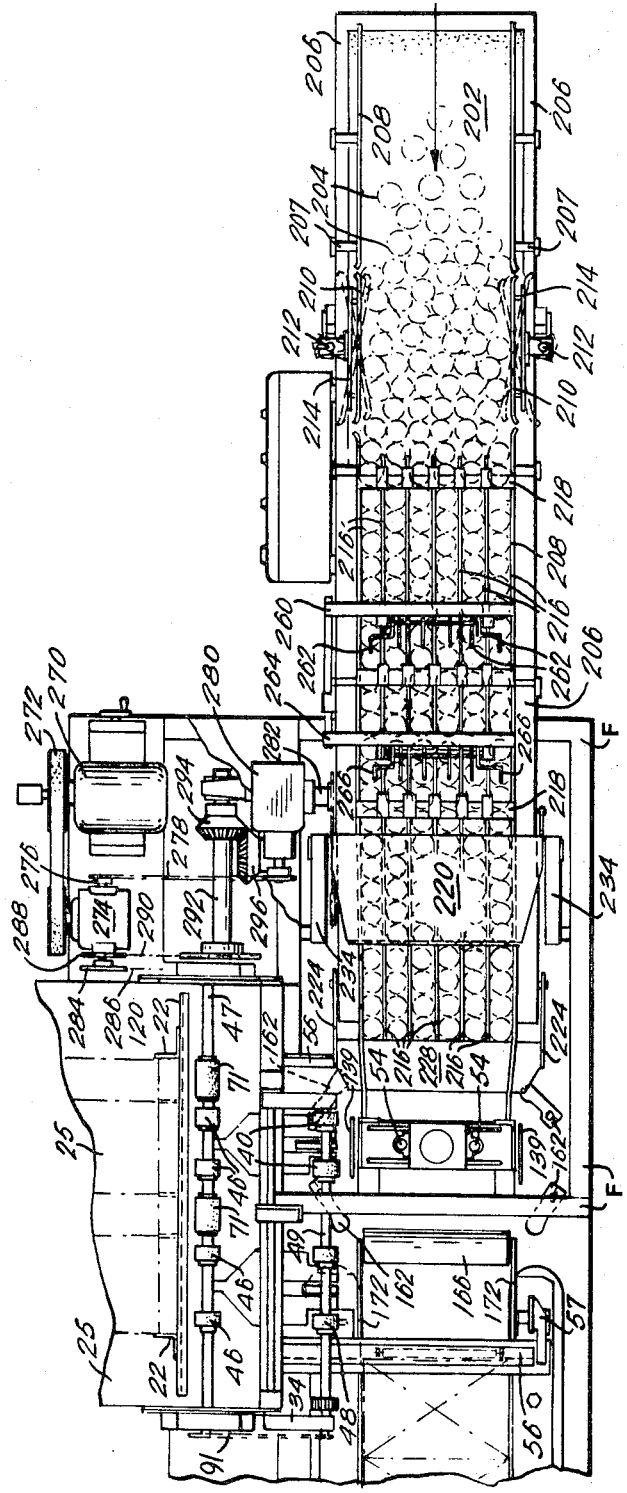

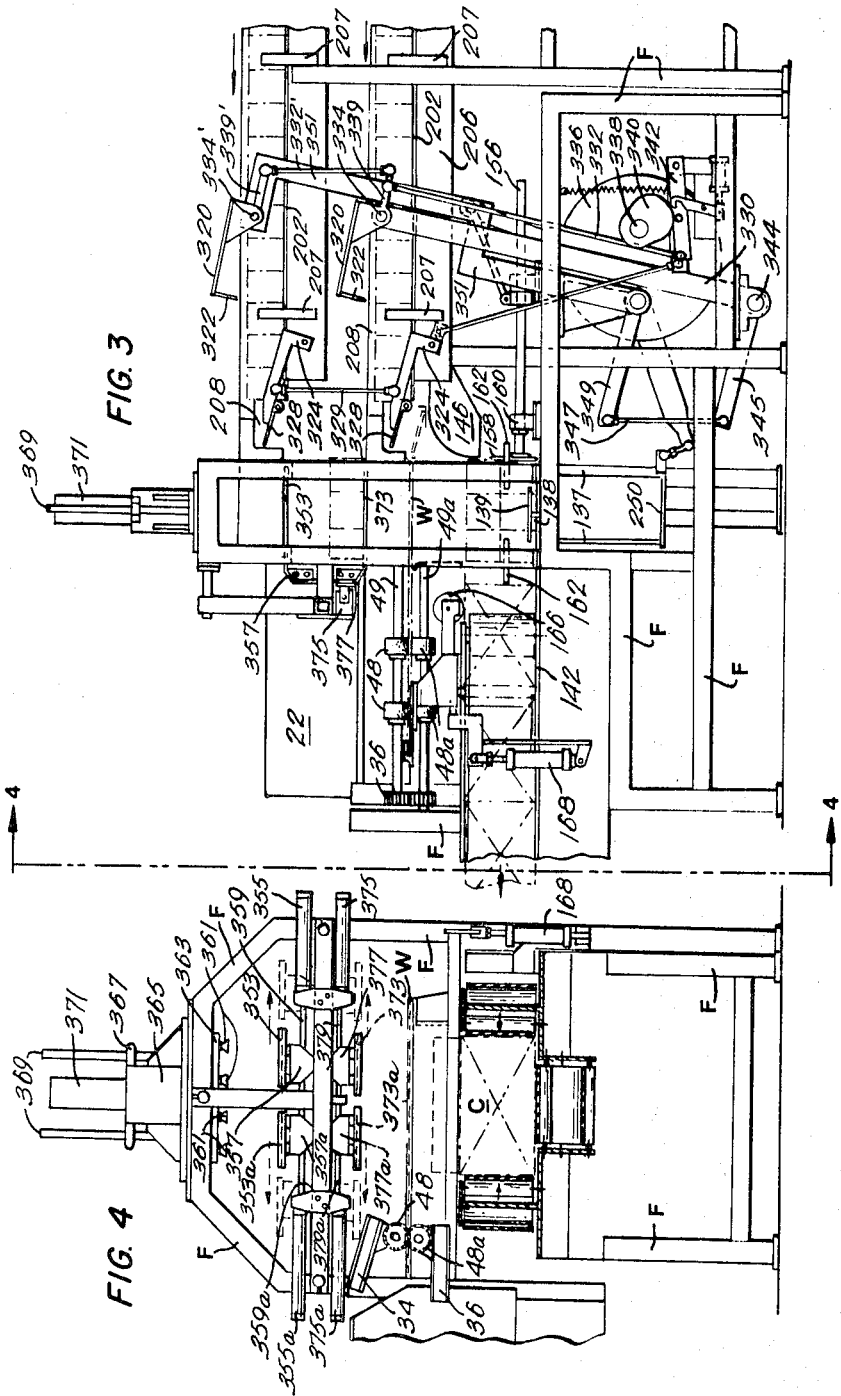

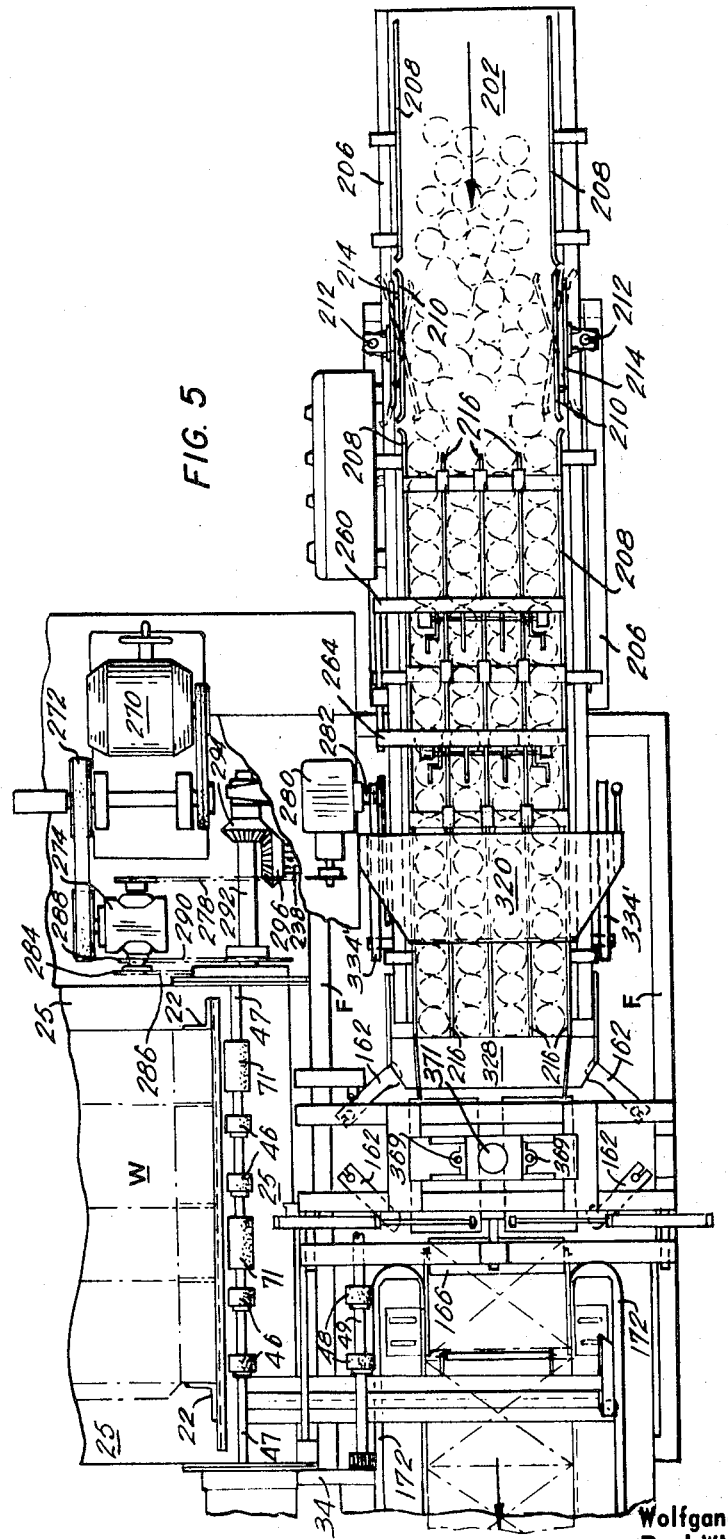

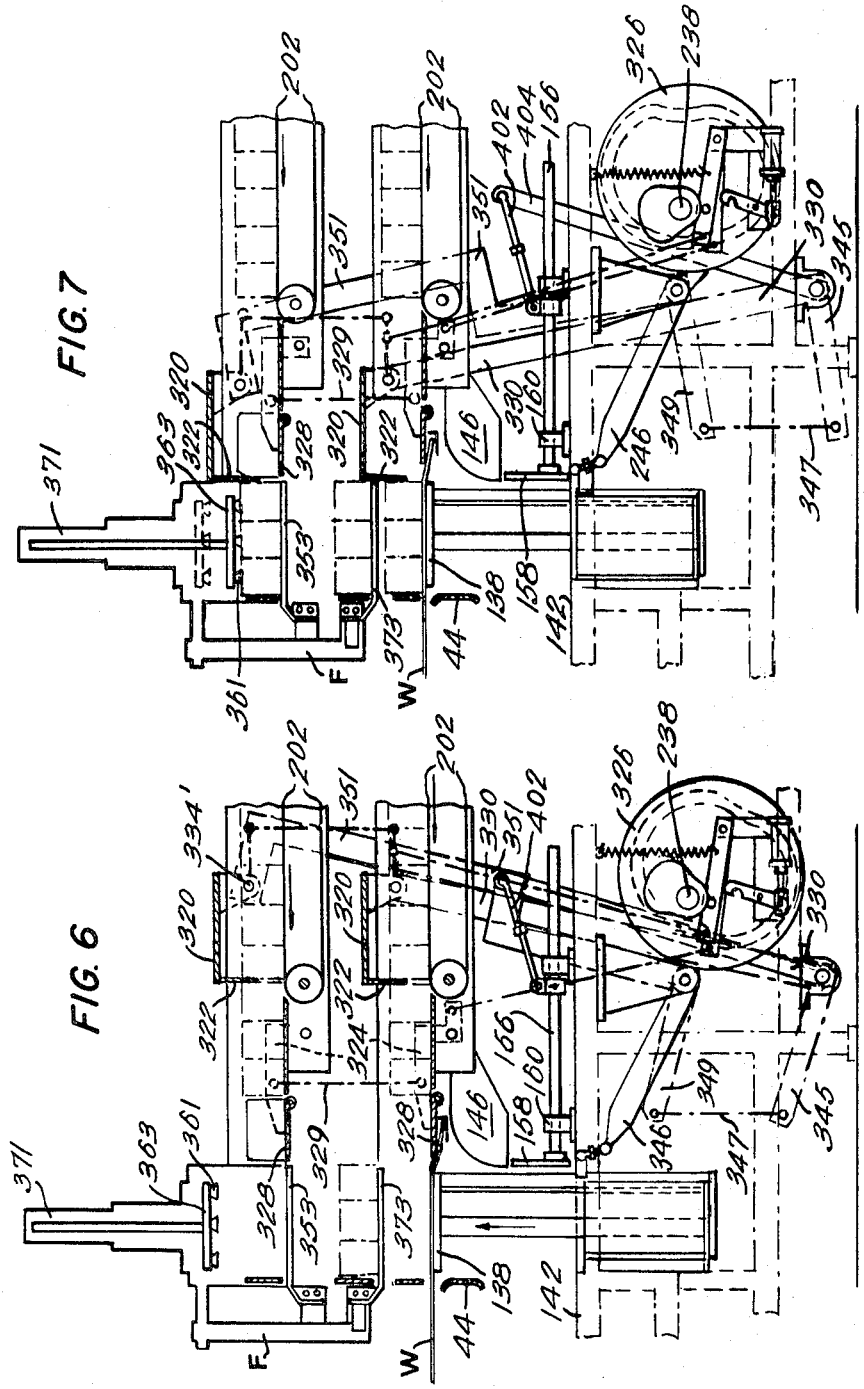

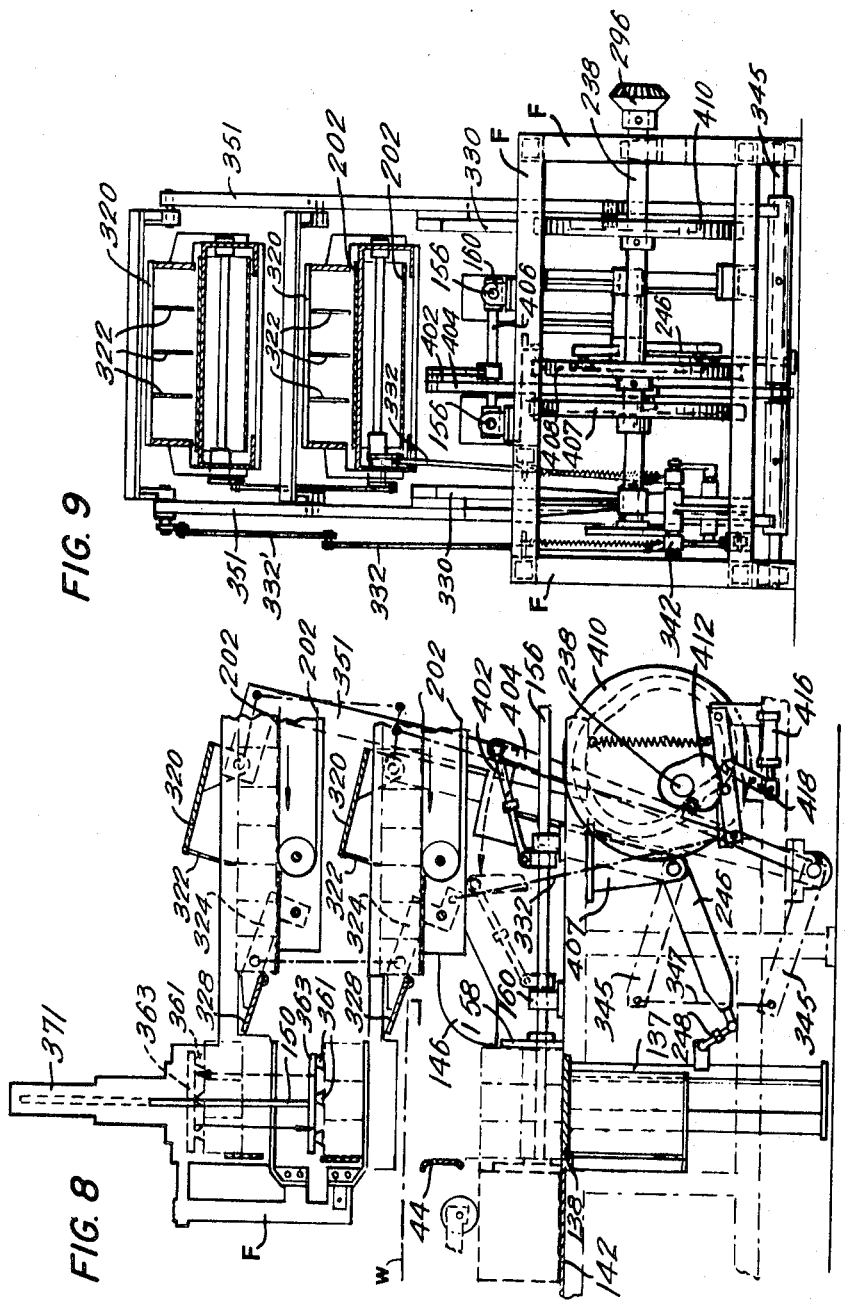

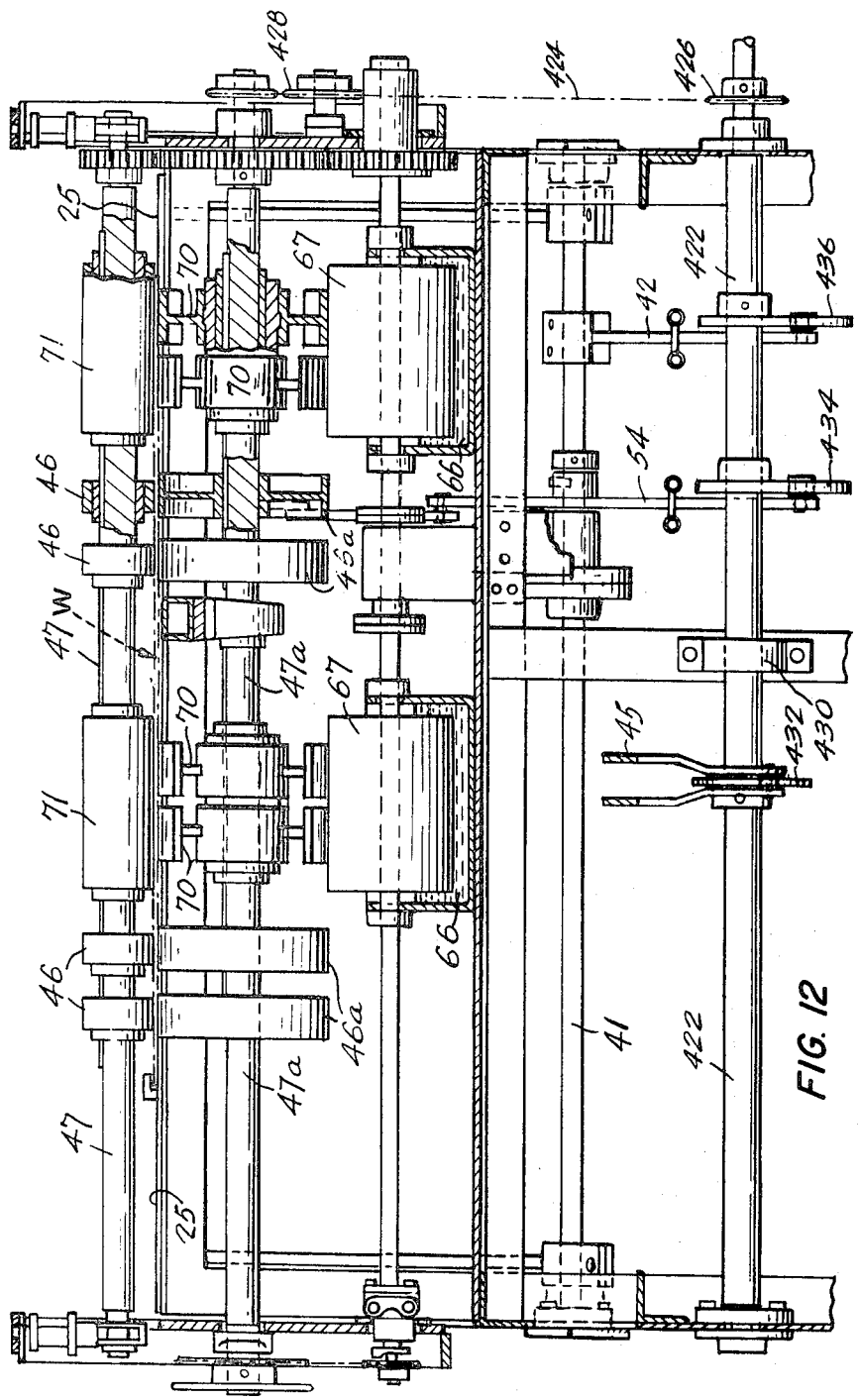
FIG. 12
*INVENTORS*
Wolfgang HOFFMANN
Paul WICK
ATTORNEY

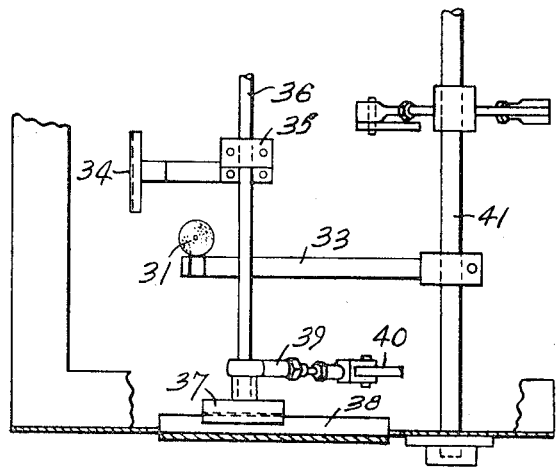
FIG. 14
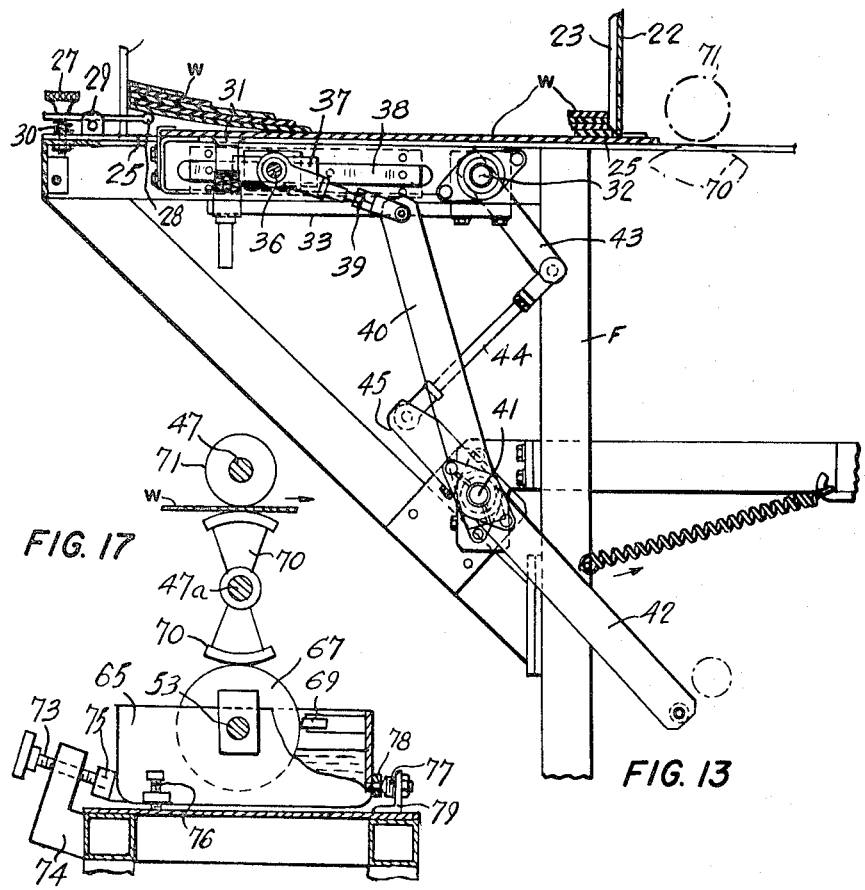
FIG. 17
FIG. 13
INVENTORS
Wolfgang HOFFMANN
Paul WICK
ATTORNEY

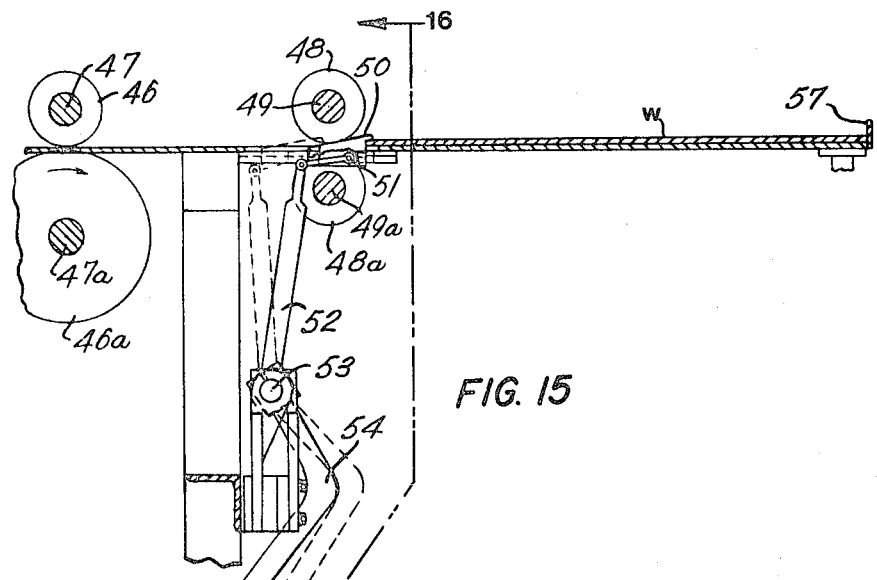
FIG. 15
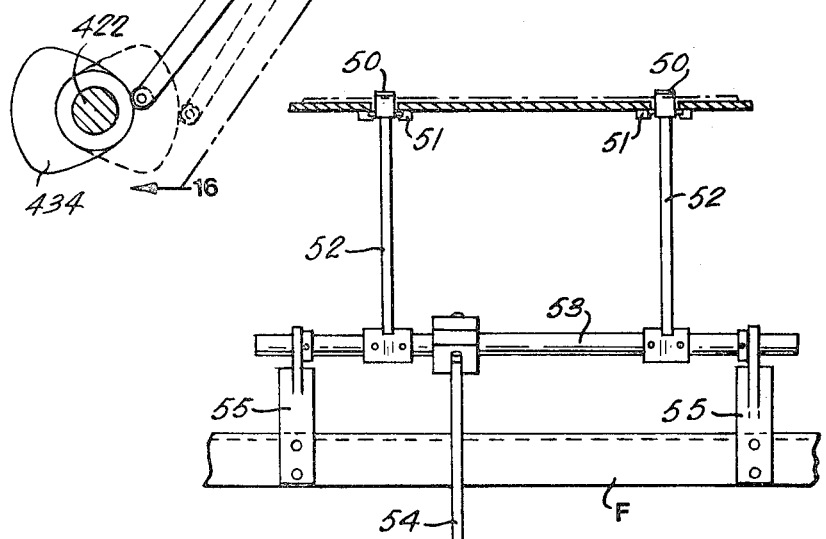
FIG. 16
INVENTORS
Wolfgang HOFFMANN
Paul WICK
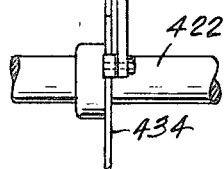
ATTORNEY

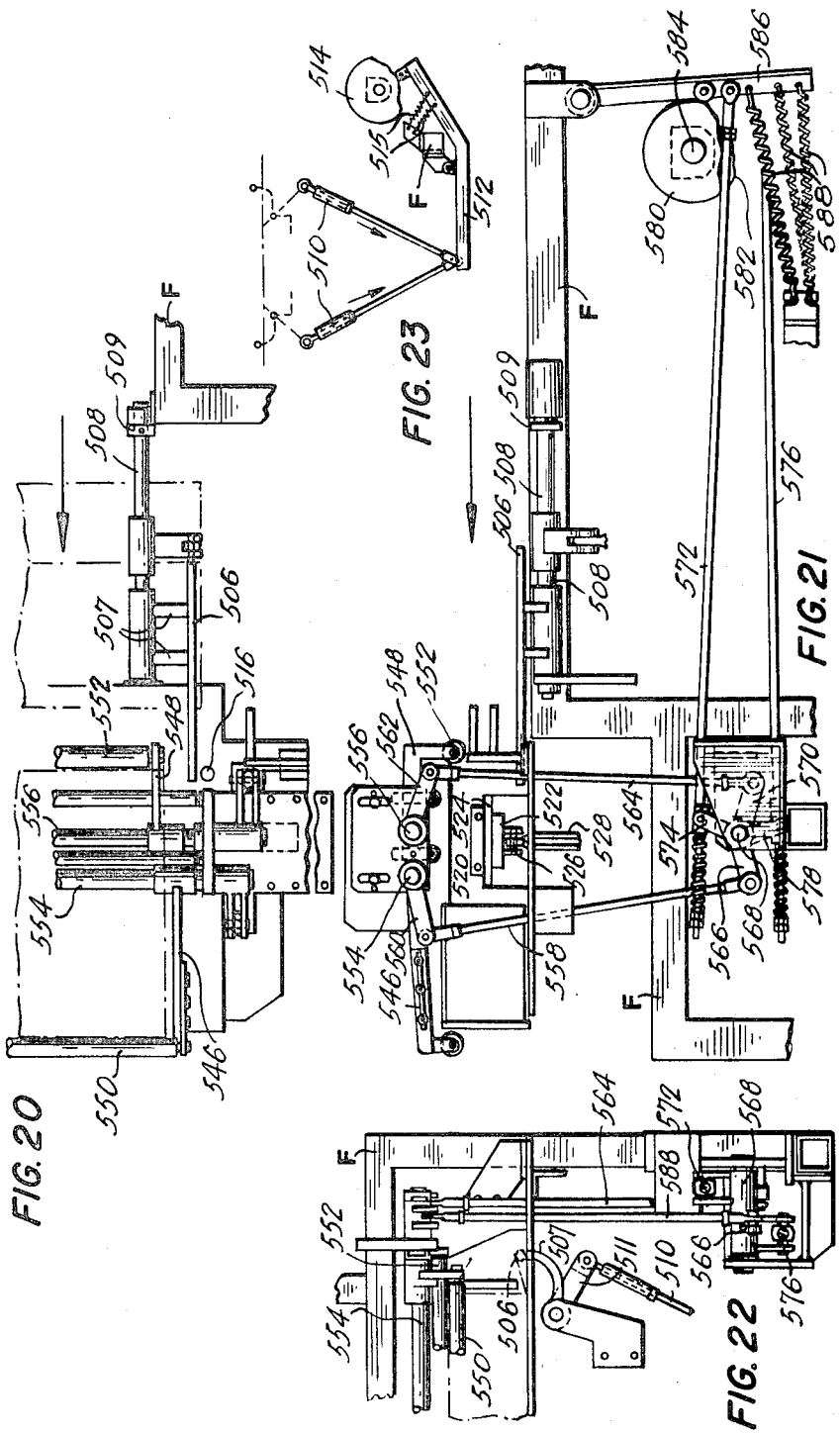

PACKAGING APPARATUS

This invention relates to a wrapping apparatus.

More particularly, one aspect of this invention relates to an apparatus for feeding a predetermined number of selected commodities from an array of such presenting and presenting such commodities to a wrapping device for wrapping the selected commodities.

In the art of wrapping commodities, there are various known devices and method which present commodities to a wrapping apparatus, which commodities are to be packaged in a wrapped bundle. Part of the problem in attaining and retaining a high-speed wrapping operation is the speed at which the commodities are presented to the wrapping device for wrapping. It has been common in this art to feed an array of commodities to a wrapping device by conveying means and pushing a predetermined number of packages from the conveying means into the wrapping apparatus, using a reciprocating pusher or the like. In other methods and apparatus, such as those in U.S. Pat. No. 2,013,555 and U.S. Pat. No. 2,869,297, commodities are fed to a wrapping operation along conveyors, where they are placed in arrays, with the conveyor directly advancing the commodities to a wrapping operation without the commodities having been prearranged by other suitable components prior to being fed to the wrapping components.

It is most desirable, in feeding commodities to a wrapping apparatus, to be able to maintain a high-speed feed, which is accurate and presents the commodities to the wrapping apparatus whereby the first wrapping operation can be carried out without preliminary steps of aligning or awaiting the desired number of commodities to be placed in the wrapping apparatus. Further, in order to ensure a high-speed operation, it is also desirable that the commodities be preselected into arrays to be wrapped just prior to introduction into wrapping operation whereby any given array does not have to travel any sufficient distance prior to being wrapped, in order to avoid possible disruption of the array. To this end, applicant has developed an improved feeding apparatus for presenting a prealigned and selected number of commodities to a wrapping apparatus whereby the wrapping apparatus may commence an initial wrapping operation without preliminary steps or the necessary equipment, to maintain any aligning or other operations. Further, the improved apparatus of this invention permits a very fast feeding operation, thus permitting the total wrapping operation to proceed at a faster rate of speed.

In accordance with one aspect of this invention, there is provided an apparatus for aligning and selectively feeding a commodity, from a plurality of such commodities, to a wrapping apparatus which includes first advancing means for advancing a plurality of commodities, means for aligning said commodities, while advancing, into predetermined alignment, selecting means for selecting a predetermined number of aligned commodities, second advancing means for advancing the selected commodities and presenting said commodities to said wrapping device, said second advancing means advancing said commodities to said wrapping device at a rate faster than the advancement of said commodities by said first advancing means, means for preventing unselected commodities from advancing to said wrapping device when said second advancing means is advancing said selected commodities.

In accordance with an alternate aspect of this invention, a further embodiment of applicants' apparatus includes a pair of spaced-apart upper and lower commodity-feeding systems, each system being adapted to supply an array of commodities to the wrapping apparatus, and including first advancing means for advancing a plurality of commodities toward said wrapping apparatus, means for aligning a plurality of commodities into an aligned array while being advanced by advancing means, said lower system including second advancing and selecting means for selecting and feeding to said wrapping apparatus, in the feeding direction of said first advancing means a predetermined number of the aligned array of commodities at a speed greater than the speed of advancement of the commodities by said first advancing means, said upper system including second advancing and selecting means for advancing and selecting, in the feeding direction of said first advancing means, a predetermined number of the aligned array of commodities at a speed greater than the speed of advancement of said first advancing means, said upper and lower systems each including means for preventing unselected aligned commodities from advancing past a leading point at which said commodities were selected by said second means, first retaining and supporting means for receiving the selected advanced aligned array from said second means for said upper system, second retaining means for retaining and supporting a selected aligned array, said second retaining and supporting means being located in operative relationship to said first retaining and supporting means and to the point of advancement of an aligned array by said second advancing means of said lower system, first placing means for placing a selected aligned array from said first retaining and supporting means onto said second retaining and supporting means, second placing means for placing an aligned array from said second retaining and supporting means into juxtaposition with an array of commodities advanced by said second advancing means from said lower system, means for operating said second advancing means of said upper and lower systems in unison whereby said lower system advances a selected aligned array to said wrapping apparatus and said second advancing means of said upper system advances a selected aligned array to said first supporting means, means for actuating said second placing means and said second advancing means of said lower system in unison whereby said second placing means places a selected aligned array from said second retaining means in juxtaposition with an advanced array from said second system, and means for operating said first placing means in conjunction with said second placing means whereby said first placing means places a selected aligned commodity from said first retaining means onto said second retaining means after said second placing means has removed an array therefrom.

According to the further aspect of this invention, there is provided a method of aligning and feeding an array of commodities from a plurality of unaligned commodities which includes the steps of providing a source of unaligned commodities, advancing the unaligned commodities at a predetermined rate of speed, causing said commodities to be aligned into an array of aligned commodities, while advancing said commodities, selecting a predetermined number of aligned commodities and advancing the selected predetermined aligned commodities to a wrapping operation, while preventing further aligned unselected commodities from advancing beyond the leading point at which the commodities were selected, the step of advancing the commodities after selection being carried out at a faster rate of speed than the speed at which the commodities are advancing, and presenting the advanced commodities to a wrapping apparatus.

In a preferred embodiment of the method of the present invention, two feeding operations are carried on simultaneously whereby juxtaposed layers of commodities may be fed to a wrapping apparatus. To this end, the method includes the steps of providing two spaced-apart parallel sources of unaligned commodities, advancing the unaligned commodities from each source at a corresponding predetermined rate of speed to a wrapping operation, causing the commodities from each source to be aligned into rows of commodities, selecting and advancing a first predetermined number of commodities to one of said sources and feeding the selected commodities to a wrapping operation from said one source and halting the movement of commodity at the point thereby to form a first aligned array, selecting and advancing a corresponding predetermined number of commodities from said other source and advancing the selected commodities to an intermediate zone and halting the movement of the thus advanced commodity in said intermediate zone, thereby to provide a second aligned array, providing a third aligned array of a corresponding predetermined number of commodities from said other source, placing said third array in juxtaposition with the first array of predetermined number of commodities, presenting the combined juxtaposed prealigned arrays of commodities to a wrapping operation, transferring said second array from said intermediate zone to provide said third array, and repeating the steps sequentially.

The method and apparatus of this invention may be incorporated into a wrapping operation, whereby the various components and steps of applicants' invention operate sequentially in conjunction with the steps performed in the wrapping operation, to provide accurate and fast feeding of commodities to the wrapping system. Thus, according to a further aspect of this invention, there is provided a wrapping apparatus suitable for use in conjunction with the above described methods and apparatus. More particularly, the wrapping apparatus includes a wrapper storage area, selecting and feeding means for individually selecting and feeding a flat one-piece wrapper from the storage area, a downwardly movable elevator platform for receiving a flat wrapper, drive means for positively lowering the elevator platform, commodity-feeding means for presenting and placing on the flat wrapper on the elevator platform a commodity to be wrapped (as hereinbefore outlined) wrapper-engaging means for juxtaposing opposed side portions of the wrapper between upper and lower stations through which the elevator platform downwardly moves whereby one pair of opposed side portions of the wrapper are juxtaposed to the commodity when it reaches the lower station, second wrapper-engaging means to inwardly fold against the transverse sides of the commodity wrapper portions extending from the lateral side wrapper panels, third wrapper-engaging means to inwardly fold the bottom portion of the wrapper sections extending from the bottom of the wrapper to upwardly fold them thereby to retain the minor portions juxtaposed to the transverse side of the commodity, further wrapper folding means in advance of the lower station for juxtaposing the top panel of the wrapper to the commodity, advancing means for acting on the wrapper for advancing the partially wrapped commodity to said last mentioned wrapper-folding means, and means for folding top panel sections extending from the top portion of the wrapper to the transverse sides of the commodity and to close the commodity in a fully wrapped manner.

The apparatus includes glue-applying means for applying glued to preselected portions of the sheet wrapper as the wrapper is fed to the elevator platform.

In this respect, the wrapper employed in the present invention is of the type, which, briefly summarized, includes a sleeve extending about a commodity closed by means of a manufacturer's flap, with the lateral sides of the commodity being closed by first pairs of panels extending from the transverse sides of the wrapper, and closed and sealed by overlaid second pairs of wrapper emanating from the top and bottom panels of the wrapper. Thus, in both above aspects, the glue is applied to the wrapper to cover the portions of the wrapper which the manufacturer's flap overlies, and a first pair of side panels of wrapping material which are overlaid by the second pair of wrapper panels.

In the first aspect, and according to the novel glue-applying means, applicant's development includes means for retaining a supply of glue, glue-receiving wheels rotatable in said glue-retaining means, glue segments for receiving glue from said glue wheels and applying glue to selected portions of the wrapper, means for causing said wheels and segments to rotate in conjunction with said wrapper selecting and feeding means, and means for retaining at least the selected portions of a blank, to which glue is to be applied, in contact with said segments as the wrapper blank is advanced by the wrapper-selecting and feeding means. Normally, the form of the glue-applying means will comprise a pair of glue baths which retain a supply of glue (with suitable feed means for replenishing the glue supply) each bath having a glue wheel or shoe rotatable therein. The glue wheels or shoes and segments will normally be mounted on a single separate rotatable shaft, driven by suitable means, located in a plane beneath the plane of the direction of feed of the wrapper blank. Preferably, the shafts are rotatable in conjunction with the operation of the overall apparatus, in response to the feeding of a wrapper blank.

Glue, as applied to the wrapper according to the above apparatus, will be applied to the exterior surfaces of the first pair of panels overlaid by the second pair of panels, and to the portion of one side wrapper panel which the manufacturer's flap overlays. In applicant's apparatus, the wrapper is fed with the panels or flaps to which flue is to be applied, in a direction transversely to the direction of the wrapper feed. To this end, the glue segments will have a width or length of glue-applying surfaces corresponding to the areas of the panels to which glue is to be applied. Normally, the circumference of the segment corresponds to the overall width of the wrapper blank, with the glue-applying surface of the segment being only a portion of the circumference whereby when the wrapper blank is advanced, glue is applied to the appropriate panels.

The glue segments and wheels can be of any suitable material, width and length as required. The glue-applying segments may be striated to apply ribbons of glue rather than a continuous pattern.

The means for retaining the wrapper blank, as it is fed, in contact with the glue segments and their surfaces preferably form part of the wrapper-advancing means, as hereinafter described. To this end, downward pressure on the wrapper blank is created whereby the glue segments will print the glue upon the advancing wrapper.

In the alternate aspect of this invention, there may also be employed with applicant's apparatus, a "hot melt" type of glue system as follows. The partially wrapped commodity, in arriving at the lower station, has wrapper panels applied to the lateral sides of the commodity with other wrapper flaps applied to the transverse sides of the commodity, with he top and bottom portions of the wrapper, extending from the top and bottom panels of the wrapper, still be be folded into juxtaposition. To this end, the bottom portion of the wrapper is upwardly folded a distance sufficient to retain the juxtapose transverse side panels, and spray means for applying a hot melt spray are provided whereby the commodity, as it is advanced by the advancing means, is sprayed with adhesive on the in-folded transverse side panels whereafter the remaining panels of wrapper material are subsequently juxtaposed to the in-folded panels to seal the sides of the commodity.

The elevator platform, movable downwardly between the upper end and lower stations, can be suitable means for the purpose desired. It preferably comprises a supporting surface of a size corresponding approximately to the size of the bottom area of the commodity to be wrapped. The drive means for positively lowering and returning the elevator platform, preferably comprises a reciprocating arm connected to tee lower surface of the elevator platform, driven in turn by a central or common drive system for the apparatus described hereinafter.

The components of the apparatus of this invention, are all driven in time-related intermittent sequence, To this end, the apparatus includes a common drive means from which the various components are driven. The common drive means comprises a cam shaft, mounting a plurality of eccentric cams, with suitable connecting rods pivotally connected thereto, for causing the various components to be driven. Suitable means, e.g. an electric motor, are provided to drive the cam shaft.

The first means for juxtaposing the first pair of opposed side wrapper panels to the commodity is located between the upper and lower stations or zones, and can be any suitable means for causing the appropriate portions of the wrapper to fold upwardly about the opposed sidewalls of the commodity. Thus, for example, a pair of spaced-apart fixed plates, or fingers, can be used. Thus, the first means for juxtaposing the first pair of opposed wrapper panels actually forms a "chute" through which the commodity on the wrapper passes. The first means are effective to juxtapose the appropriate portions of the wrapper prior to the subsequent wrapper-folding means operating.

The second folding means for folding in the flaps from the juxtaposed sidewalls preferably comprises movable arms located at the lower station for abutting the flaps and juxtaposing them to the respective transverse sidewalls in the commodity. These means are actuated just prior to the elevator platform arriving at the lower station. Once the side flaps are thus placed in juxtaposition, further means for upwardly moving the extending portion of the bottom panel of the wrapper and provided. In one embodiment of this latter aspect, and depending on the particular form of glue apparatus and method employed, the last-mentioned means will juxtapose the extending bottom portion of the wrapper into contact with the juxtaposed transverse side wrapper portions (when the glue is applied as the wrapper is being fed to the upper zone), or in the further embodiment, the bottom portion of the wrapper will be extended upwardly a distance sufficient to retain the juxtaposed transverse side wrapper portions. Normally, the bottom extending portion of the wrapper will be juxtaposed a distance of approximately 45°, which will permit the hot melt spray apparatus to spray the juxtaposed transverse side panels.

The folding means for juxtaposing the top wrapper panel, and for sealing manufacturer's flap is preferably that described in copending application Ser. No. 013,593. Also, the folding means for juxtaposing the top portions of the wrapper extending from the top panel can be any suitable means for the purpose required.

In the apparatus of this invention, the partially wrapped commodity is advanced from the elevator platform to the component for folding down the top wrapper panel, to the apparatus described in the above copending application. To this end, the reciprocating pusher may be employed, actuated by the drive means preferably connected to the central or common drive system.

The wrapper-selecitng and advancing means for selecting an individual wrapper from the wrapper storage area and presenting it to the elevator platform at the upper station, comprises first wrapper-engaging means to separate an individual wrapper from the storage area, and to advance the selected wrapper into engagement with second wrapper-advancing means. The component for selecting the wrapper preferably comprises a pair of spaced-apart suction cups movable in a vertical plane to grip the lowermost wrapper in the storage area and to lower the wrapper a distance sufficient such that a pair of wrapper-engaging fingers can grip the rear edge of the wrapper and advance it to the second wrapper-advancing means. This latter component assumes controls of the advancing wrapper, and presents it to a third wrapper-engaging means for advancing the wrapper towards the elevator platform. Both the second and third wrapper-engaging means preferably comprise spaced-apart pairs of rollers though which the wrapper advances. In accordance with this wrapper-advancing assembly, the fourth wrapper-advancing component is included, which provides means for positioning the wrapper in alignment directly over the elevator platform at the upper station. This latter component preferably comprises a resilient metal spring clip adapted to advance the wrapper a minor distance. The resilient metal clip operates on the trailing edge of the advancing wrapper advanced by the third advancing means whereby the spring pushes the trailing edge of the wrapper so that the wrapper advances the required distance into alignment with the elevator platform. The upper station or zone may include guide means for halting the forward movement of the wrapper, such guide means acting as stops.

Referring in greater detail to the apparatus and method for aligning and selectively feeding a commodity, and to the above described wrapping system, this invention finds particular application where the commodities are to be wrapped in the form of a plurality of rows or aligned individual commodities, such as cans, etc. The method and apparatus of the present invention are also capable of providing aligned rows of two layers of juxtaposed commodities, such as is commonly encountered in can-wrapping operations.

According to one embodiment of the invention, the apparatus for aligning and feeding a commodity may take the form of a single feeding apparatus, or according to a further embodiment, the apparatus may include a pair of feeding systems for feeding two layers of commodities to a wrapping apparatus.

The first advancing means may be in the form of a suitable conveyor or similar system whereby commodities to be wrapped are placed thereon from a prior operation, such as a package-filling operation, and advanced along the conveying means at a predetermined speed which is normally the speed at which the commodities are placed on the conveying means. This rate of speed therefore normally depends on the speed at which the commodities are being produced by a prior operation, and therefore may vary according to various types of commodities, etc. In the embodiment where two feeding systems are employed, both conveyors are desirably operating at the same speed of advancement.

When placed on the conveying means, the commodities are normally provided in a random manner and depending on the type of commodity, and the nature of the package to which they are to be formed into, the number of commodities may vary. For example, in a wrapping operation involving cans, it may be desired to form a package of a single ro double layer 12 or 24 cans, in which case the commodities will be presented to a wrapping apparatus in a single or double rectangular array of four cans by six cans, etc.

For the purposes of aligning the commodity, there are provided means for accomplishing this purpose. Such commodity aligning means may be guide channels on the conveying means into which the commodities are fed as they are advanced by the conveying means. The number of guide channels would depend on the number of commodities desired the form the array. According to an embodiment, there may also be provided means for aiding alignment of the commodities into guide channels by subjecting the commodities to a vibration or oscillation as they advance on the conveying means whereby alignment may be carried out faster.

In accordance with this invention, there is provided selecting means for selecting a predetermined number of commodities, and means for advancing the selected commodities to the wrapping device, which means operates to advance the commodities at a greater rate of speed than the first advancing means. According to a preferred embodiment, the selecting and advancing means comprise a single unit, including commodity-engaging means and means for advancing the commodity-engaging means in the manner described above. The commodity-engaging means may be any suitable device capable of engaging and advancing a predetermining number of selected commodities, such as, for example, means located above the commodities, adapted to engage a row of commodities, means for lowering the commodity-engaging means into operative relationship with the commodity, and means for advancing the lowering commodity-engaing means. In the embodiment, where there are provided a plurality of commodity-engaging means adapted to engage a plurality of rows of aligned commodities, downwardly extending fingers mounted on a common supporting system may be used. The supporting system may then be connected to suitable means for advancing the supporting system, and returning the system to engage a further selected number of commodities. In the preferred embodiment, the supporting system may be lowered to engage the commodities, and remain in engagement as the commodities are advanced to the wrapping device and at the forward end of the stroke, are raised from commodity-engaging position and returned to the point at which the commodities are selected whereupon the cycle is repeated.

The means for preventing unselected commodities from advancing to the commodity-wrapping device, by the first advancing means, can comprise suitable barrier means, operating in conjunction with the above described second advancing means. To this end, barrier means may be provided at the leading point of the commodities whereupon the selecting means for selecting a predetermined number of commodities operates to remove the barrier means and permit the second advancing means to advance the commodity. The barrier means is then actuated to prevent further commodities from being advanced by the first advancing means until the selecting means has selected a further predetermined number of commodities. Suitable barrier systems include means for engaging the leading point of commodities advanced by the first advancing means, and means for removing the barrier means upon selection of the predetermined number of commodities.

In the embodiment of this invention, where there is provided a feeding system for feeding two layers of commodities to a wrapping apparatus, the above described first and second advancing means, means for aligning the commodities, and means for selecting a predetermined number of commodities may each be included in vertically aligned spaced-apart parallel feed systems, each feed system receiving commodities from a prior commodity processing operation, and feeding the commodity to a wrapping apparatus according to a further embodiment now to be described. To this end, the pair of feeding systems comprising upper and lower feeding systems includes first retaining and supporting means may comprise a removable supporting platform, onto which the selected array of commodities is advanced by the second advancing means of the upper system. Operating in conjunction with the first supporting means are first commodity-placing means adapted to engage a commodity therefrom, and place the commodity on second retaining and supporting means.

The first commodity-placing means preferably may comprise a suction system whereby an array of commodities, for example, cans, is taken under control, and placed on the second supporting system. In a preferred embodiment, the first supporting system comprising a pair of supporting plates removable from the plane on which commodities were fed by the second advancing means of the upper system, whereby the first placing means, upon engaging the commodities merely lowers the commodities to the second supporting system.

The second supporting system is preferably similar to the first supporting system and includes a pair of supporting surfaces which are removable from the plane at which the commodities were placed thereon by the first placing means. The second supporting system is in operative relationship to the point at which the second advancing means of the lower system advanced the commodities, and means are provided for placing a commodity for said second supporting system into juxtaposition with the commodity advanced by the second advancing means of the lower system. To this end, means for placing a commodity from said second supporting system in juxtaposition, preferably operates in conjunction with the second supporting system whereby the second supporting system may be removed from supporting a commodity and the commodity merely lowered on its own by gravity onto a commodity advanced by the lower system. To this end, the second supporting system is therefore desirably mounted in a plane vertical and coextensive with the point at which the second system is advanced. Upon actuation of means for removing the second supporting system from supporting the commodity, the commodity will then fall or be lowered.

The drive means for both embodiments of this invention, whereby the various components are operated in time-related sequence, is preferably a central drive system, and if desired, the system may operate in conjunction with the wrapping apparatus. A preferred central drive system includes a main drive shaft, a plurality of eccentrically mounted cams on said drive shaft and means for connecting said cams to the first and second advancing means, the selecting means and means for preventing advancement of unselected commodities. Suitable means for rotating the drive shaft, such as an electric motor, will be provided.

If desired, two or more components of applicant's feeding apparatus may operate from the same cam, whereby such components will be driven in time-related sequence.

Having thus generally described the invention reference will now be made to the accompanying drawings, illustrating preferred embodiments and in which:

FIG. 1 is a side elevation of a single-system feeding device, in conjunction with a wrapping apparatus;

FIG. 2 is a top plan view of the device of FIG. 1.

FIG. 3 is a partial side elevation of a two-system feeding device according to a further aspect of this invention, and shown in combination with a wrapping apparatus; (showing the first operation position);

FIG. 4 is a side elevation of the device of FIG. 3 taken along line 4—4 of FIG. 3;

FIG. 5 is a top plan view of the apparatus of FIG. 3;

FIG. 6 is a side elevation of the apparatus of FIG. 3 showing the second sequence in the operation of the device;

FIG. 7 is a view similar to FIG. 6 but showing the third sequence of operation;

FIG. 8 is a view similar to FIG. 6 but showing the fourth sequence of operation;

FIG. 9 is a view taken from the right-hand side of the apparatus of FIG. 3 but showing the arrangement of a preferred drive system for operating various components in time-related sequence;

FIG. 12 is a section taken along the line 12—12 of FIG. 10;

FIG. 13 is a section taken along the line 13—13 of FIG. 11;

FIG. 14 is a plan view of FIG. 13;

FIG. 15 is a section taken along the line 15—15 of FIG. 11;

FIG. 16 is a section taken along the line 16—16 of FIG. 15;

FIG. 17 is a side elevation of a portion of the gluing apparatus;

FIG. 17 is a top plan view of a portion of the apparatus relating to an alternate glue aspect;

FIG. 20 is a top plan view of a portion of the lower station showing more specifically the alternate glue system;

FIG. 21 is a side elevation of FIG. 20;

FIG. 22 shows in greater detail certain components of the alternate apparatus;

FIG. 23 shows further detail of the actuating means;

In the drawings, like reference numerals designate like parts; and the various frame members supporting various components are indicated by the letter "F."

Figure 11:
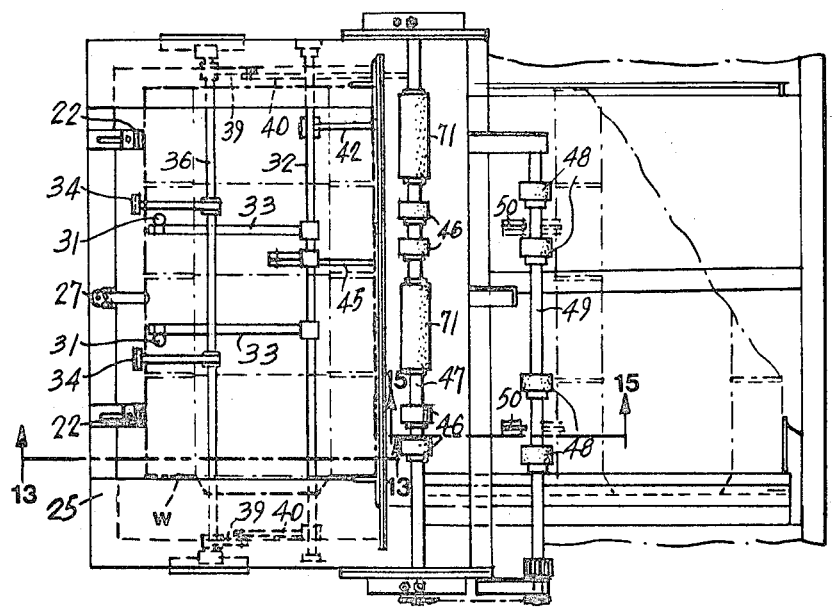
FIG. 11 is top plan view of the device shown in FIG. 10.

Referring to the drawings, the apparatus includes an upper zone or station defined in part by a supporting surface 25 and guides 56 on either side thereof, a downwardly movable elevator platform 138, and lower station or zone 142.

A first component to be described is the wrapper-storage and wrapper-feeding mechanism. This mechanism is located at the upper station, mounted on supporting platform 25.

The platform 25 is mounted to a frame member F, with guides 22 defining therebetween a wrapper storage area for wrapper blanks W. The guide 22, in the forward direction of the feeding of the wrapper blank (towards the elevator platform) is spaced from the supporting surface 25, a distance equivalent to the thickness of one blank. This same guide 22 includes spacers 23 extending in the vertical direction of the guide and terminating a short distance above the terminal point of the bottom of the forward guide. This arrangement will permit, as shown in the drawings, all but the last or lowermost wrapper blank W to be spaced slightly outwards from the forward guide 22 and the lowermost blank to be exposed to the opening between the guide 22 and the supporting surface 25, and the second lowermost blank to be in a position to be preselected.

The wrapper storage area is constructed at the rear end of the storage area, to include a manual adjustment for raising the trailing end of the wrapper blanks in order to compensate for warped or distorted sheets of and and in order to insure the positive positioning of the leading edge of the lowermost blank for feeding between the aperture of the front guide 22 and the supporting surface 25. The device consists of an adjustable spindle 27 and a pivotably mounted supporting rod and bearing 29. The spindle 27 contains a spring 30.

The wrapper-selecting and advancing means, as previously mentioned, is a four-component assembly. The first component comprises a pair of spaced-apart suction cups 31 each mounted on a shaft 32. Shaft 32 is connected to the suction cups by means of a lever 33, permitting vertical movement of the suction cups 31. Operating in conjunction with the suction cups are means for selecting the lowermost wrapper blank engaged by the suction cups comprising a pair of U-shpaed brackets 34. Brackets 34 are connected to arm 35 mounted, in turn, on a movable shaft 36. Shaft 36 is supported by parallel slide members 37 sliding in bar 38. Shaft 36 is connected through a connecting rod 39 to a movable arm 40 which is pivotally mounted on shaft 41. Shaft 41 is connected to lever 42, whose movement is controlled by a central or common drive system, hereinafter described. Lever 43 is connected via connecting rod 44 to a drive lever 45 which rotates on shaft 41. Lever 45 is driven through the common drive system, as hereinafter described.

The second component for advancing a selected wrapper by the above-described means comprises a pair of spaced-apart drive rollers 46 and 46a mounted on rotatable shafts 47 and 47a driven by a drive system hereinafter described. Operating in conjunction with the last-mentioned means is a third component comprising a further pair of spaced-apart drive rollers 48 and 48a, mounted on rotating shafts 49 and 49a. Shafts 48 and 48a are driven by means hereinafter described.

The fourth component of the wrapper-advancing assembly comprises a spring-loaded clip assembly adapted to advance the wrapper the final distance required to the elevator platform at the upper station of the apparatus. The spring clip assembly comprises a U-shpaed spring 50 mounted on a parallel slide mechanism 51 which in turn is driven by a connecting arm 52 through a pivotally mounted shaft 53, the shaft being rotated by a lever 54 driven by the central drive system hereinafter described. Shaft 54 is mounted to a subframe member F, by means of brackets 55.

The upper platform of station of the apparatus includes guides extending from the wrapper storage area to either lateral side of the elevator platform, the guides comprising U-shaped members 56, with stops 57 defining the limit of the forward movement of the wrapper advanced by the wrapper-selecting and advancing means.

Operating in conjunction with the wrapper-selecting and advancing mechanism, according to one embodiment of this invention, is glue-applying means adapted to apply glue to selected portions of the wrapper as it is advanced. According to this embodiment, the glue-applying means is mounted beneath the supporting platform 25 in the direction of feed of the wrapper blank and comprises a pair of glue baths 65 containing glue 66 therein. Any suitable means for feeding the glue into the baths and for maintaining the level of the glue therein may be employed.

Rotating in the glue baths 65 are a pair of glue wheels 67 journaled on a shaft 53 driven by means hereinafter described. Glue wheels 67 pick up, on their surface, glue from the bath. The amount of glue picked up by the wheels 67 is regulated by a doctor blade 69. Operating in conjunction with and containing the glue wheels 67 are rotatable glue applying segments 70 connected to the shaft 47a. Supporting surface 25 contains a plurality of apertures therein, permitting segments 70 to contact the underside of an advancing wrapper fed by the previously described means. Operating in conjunction with the glue-applying segments 70 are rollers 71 adapted to maintain the advancing wrapper in contact with the glue-applying segments as the wrapper is advanced. Rollers 71 are mounted on shaft 47 just mentioned.

The glue-applying segments are so constructed that their glue-applying surfaces correspond to the width of the wrapper portion to be coated with adhesive. Thus, the length of the arch described by the glue-applying segments preferably equals the width of the portion of the wrapper to be treated with glue. Shaft 47, connected to subassembly frame members, is spring loaded by means of springs (not shown) to maintain downward pressure on the wrapper as the wrapper is advanced. The shaft 47a is also suspended to maintain a proper distance between the rollers 67 and the glue segments 70.

The glue system may be adjusted to permit raising or lowering of the glue system. To this end, a manually adjustable pin 73, mounted in a bracket 74 connected to the frame abuts a sloping block 75 connected to the glue bath 65, on one side thereof. The glue bath 65 is mounted to a frame by means of a manually adjustable threaded screw arrangement 76, normally resting in a position slightly spaced from the frame.

On the opposite side of the glue bath 65 to the adjustable member 73, is a conical shaped pin 77 connected to a bracket 79 mounted to the frame, with the glue bath 65 being connected to the pin by means of a hollow bushing 78. In this manner, by tightening the adjustable pin 73, the glue bath may be adjusted.

The commodity-wrapping device of the apparatus includes a downwardly movable elevator platform 138 operating between upper station or zone 25 and a lower station of zone 142. The upper station and platform is the level at which a wrapper is fed into position on the elevator platform. Guides 144 and 146, located be between the upper and lower stations, serve to juxtapose opposed lateral side portions of the wrapper blank to the commodity as the latter is lowered on the wrapper blank on the elevator platform 138. Elevator platform 138 is driven by suitable means, hereinafter described, with guides 137 serving to guide the elevator platform 138 as it descends.

In the embodiment shown in FIG. 1, there is provided a pusher P adapted to operate in conjunction with the elevator platform 138 wherein a commodity placed on a wrapper W is lowered onto elevator platform 138 with the pusher P aiding in retaining and lowering the commodity between the upper and lower stations. Pusher P comprises a pressurized operated piston assembly including housing 148, piston rod 150, which mounts a shoe 152 and guides 154 guiding the lowering of the piston rod 150.

The second component for folding in additional portions of the wrapper into juxtaposition with the transverse sides of the commodity is mounted at the lower station and comprises two pairs of movable arms 162 on either transverse side of the lower station. The movement of arms 162 is tied in with the overall operation of the apparatus, and these arms serve to juxtapose first transverse side wrapper portions, extending from the lateral side panels of the wrapper, to the transverse sides of the commodity. Also, mounted at the lower station are third folding means for juxtaposing the bottom portion of wrapper material, extending from both transverse sides of the wrapper, to overlie the folded-in transverse wrapper portions. These third folding means comprise a T-shaped bear 139, operating in conjunction with the lowering of the elevator platform whereby after the arms 162 fold in the first transverse wrapper flaps, T-shaped bars 139 are actuated to fold upwardly the bottom transverse wrapper portions to overlay the juxtaposed wrapper portions.

Mounted to the rear at the lower station of the wrapping apparatus, there is provided means for advancing a partially wrapped commodity off the elevator platform 138 comprising a pusher assembly consisting of pusher rod 156 mounting at one end a push plate 158. Rod 156 is movably journaled in housing 160 connected to frame F. The pusher rod 156 is actuated by means hereinafter described.

The wrapping device, in the embodiments illustrated, further includes means for folding down the top wrapper panel to the top of the commodity, and means for juxtaposing a manufactuer's flap to a further portion of the wrapper, according to the teachings of our copending application Ser. No. 772,603, filed Apr. 19, 1968. Briefly summarized, this includes roller 166 adapted to juxtapose a top panel to the commodity and piston assembly 168 operating on arm 170 (FIG. 1) which juxtaposes the manufacturer's flap. The partially wrapped commodities, after arriving at the lower station on the elevator platform 138 are advanced by pusher means 156 and 158 along platform 142 into engagement with pair of spaced-apart moving belts 172 which then take control of the commodity and perform the closing of the manufacturer's flap according to said copending application.

Referring now to the embodiment of the invention illustrated in FIG. 1, the feeding mechanism includes a supporting surface 202 defined by a movable conveyor belt which is adapted to advance commodities towards the wrapping device above described. As shown in FIG. 2, a plurality of radially arranged commodities, for example tin cans 204, are placed on the supporting surface from a prior operation, e.g. a filling operation, and advanced in the direction of the arrow shown in FIG. 2.

Conveyor 202 is mounted on supports 206 connected to the frame F, and includes side guides 208 connected thereto by supports 207, for preventing commodities from falling off its surface. Oscillating means defined by movable side sections 210 located between the guides 208 are adapted to juggle the commodities, on the conveyor 202, to aid in aligning them in the alignment means subsequently described. Plates 210 are oscillated by means of shaft 212 connected to the plates 210 through housing 214. In turn, shafts 212 are oscillated or vibrated by suitable means (not shown).

Means for aligning the commodities as they are advancing on the conveyor 202 comprises a plurality of spaced-apart vertical guides 216 mounted above the conveyor by means of supports 218 connected to the sides 208. In this manner, the commodities as they are advanced on the conveyor 202 are subjected to minor oscillations or vibrations from plates 210 and placed into the guide channels by adjacent guides 216 whereby the commodities form prealigned rows for a subsequent operation.

The means for selecting and advancing a predetermined number of commodities to the sheet wrapper on the elevator platform 138 as shown in detail in FIGS. 1 and 2 comprises a support 220 carrying a plurality of fingers 222, each finger being adapted to engage a row of aligned commodities in the guide channels defined by guides 216, and advance them onto the wrapper W. Operating in conjunction with support 220 is a barrier means defined by a pivotably mounted arm 224 pivoted by means of pins 226 mounted in supports 206. Arm 224 mounts a flat supporting plate 228, adapted to bridge the gap between the terminal point of advancement of the conveyor 202 and the wrapper W on the elevator platform 138 at the upper station. Plate 228 also serves as a barrier means as will be described in greater detail.

The selecting and advancing means 220 operates from a central drive system (described hereinafter) through arm 230 and rod 232 whereby rod 232 causes support 220 with fingers 222 to be lowered into a position for engaging a plurality of commodities, while arm 230 will cause advancement of the support 220 with fingers 222 to advance the commodities through the guide channels and onto the wrapper W. To this end, support surface 220 is pivotably mounted on arm 230 by means of pivot 234.

The arm 224 and supporting surface 228 are timed to operate in conjunction with the support advancement of arm 230, by suitable means, whereby when fingers 222 engage aligned commodities in the guide channels defined by guides 216, support surface 228 is in a horizontal plane and in juxtaposition with wrapper W whereby the commodities may be advanced onto the wrapper. On the return stroke of the arm 230 whereby rod 232 is activated to lift fingers 222 from the guide channels (to the level shown in FIG. 1) the supporting surface 228 returns to the position shown in FIG. 1 thereby preventing nonselected commodities from advancing to the wrapper W.

The central drive system for operating the various means of the apparatus described above is shown in FIG. 1, and comprises a rotatable shaft 238 driven by an electric motor, as hereinafter described. Mounted on the shaft 238 are a plurality of eccentric cams serving to operate various components. Thus, for example, operating in conjunction with cam 240 is arm 242 rotatably journaling rod 232 whereby the eccentric movement of the cam 240 causes arm 242 to move up and downwardly, thus causing fingers 222 to move upwardly and downwardly into commodity-engaging and commodity-disengaging positions. Arm 230 is rotatably journaled on connecting shaft 244, connected to an eccentric cam mounted on rotatable shaft 238 whereby the eccentric cam, when rotated, will cause arm 230 to operate in forward and return strokes, thus advancing and returning supporting surfaces 220 and fingers 222 in a commodity-advancing and return stroke.

In a like manner, the elevator platform is operated through arm 246 and linkage 248 connected at one end to a guide 137. The other end of arm 246 is connected to a further eccentric cam mounted on shaft 238 whereby movement of the cam will cause movement of the arm 246.

The central control system described above, is further illustrated in FIG. 9 and will be described in greater detail with reference to a further embodiment of the invention.

The apparatus shown in the drawings also includes detecting and safeguard means which are explained as follows. Detecting means 260 mounted above the conveyor 202 is adapted to determine the feed of the commodities through guide channels defined by guide 216. Detecting means 260 comprises a plurality of sensing fingers 262 extending over the guide channels and should there be no commodity feed through the guide channel, the detecting means will prevent feeding of a wrapper blank. A further detecting means 264, on the same principle, as detecting means 260, and which includes fingers 266 also serves to indicate the presence of irregularly aligned commodities in the guide channels for the selecting and advancing means 220 and 222 to operate. Thus, if an irregularly aligned commodity, such as a fallen can, passes by detecting means 260, the detecting means 264 will override the drive means of shaft 238 and thus prevent the sequence of operations for the various components to take place.

The conveyor drive means, and the means for driving the feed rollers of the wrapper-feeding system, and the central drive means are shown in FIG. 2. This comprises an electric motor 270, driving belt 272 which in turn is connected to a reducer 274 through a shaft and pulley arrangement. Reducer 274, at one end, drives sprocket 276 rotating chain 278, which in turn, is connected to a reducer 280. Reducer 280 drives conveyor 202 through shaft 282 through a chain drive system.

Reducer 274 also serves to drive the shafts 47 and 47a through sprocket 284 and chain 286. Shafts 49 and 49aare driven by the rotation of shaft 47 which includes a pulley mounting a chain 91 connected to the other end to a pulley mounted on shaft 49. Both pairs of rotatable shafts 47 and 47a and 49 and 49a are connected by means of intermeshing gears—as shown in FIG. 1 by reference number 92. Also, the same takeoff from reducer 274 mounts wheel 288 and chain 290 to rotate shaft 292 which is connected to a bevel gear 294. Bevel gear 294 meshes with further bevel gear 296, which is mounted at one end of the central drive shaft 238, as will be seen with regard to FIG. 9 describing a further embodiment.

Referring now to a further embodiment of this invention, the apparatus shown in FIGS. 3 to 9 is a variation of the apparatus of FIGS. 1 and 2, wherein there is included an upper and lower system of feeding commodities to a wrapping device. In these figures, like reference numerals have been used to designate like parts described in FIGS. 1 and 2, with regard to the first advancing means on the upper and lower systems—i.e. the conveyor 202 and its related components, the wrapping device, including elevator platform 138, and the wrappper-feeding mechanism, etc.

As will be seen in FIGS. 3 to 7, the upper and lower systems comprise spaced-apart identical feeding systems, vertically aligned with each other.

The means for selecting and advancing a commodity from aligned commodities on each of the upper and lower systems is in principle the same as that shown in FIGS. 1 and 2, and each system includes a supporting surface 320 with fingers 322 downwardly projecting therefrom, each finger 322 being adapted to be inserted into a guide channel defined by guides 216 for selecting and advancing a predetermined number of commodities.

Each of the upper and lower systems include means for preventing unselected commodities from advancing on the conveyor 202 comprising a pivotally mounted arm 324 and flat supporting plate 328. The arms 324 operate in unison through connecting arm 329.

The second means for advancing and selecting a predetermined number of commodities is driven by a central drive system as described hereinafter. This component includes arm 342 operating in conjunction with an eccentric cam which drives rod 332 connected at one end thereto and at the other end, through linkage 339, to supporting surface 320 through pivot 334, thereby serving to lower and raise the fingers 322 of the selecting and advancing means of the lower system. Rod 332' is connected to the rod 332 through a suitable linkage at one end thereof, and at the other end, through linkage 339' to the supporting arm 320 of the upper system through pivot 334' therefor, whereby the selecting and advancing means of the upper system operates in unison with that of the lower system in the manner just described.

Also connected to common drive system is arm 330, through a pivot point 344 and a further linkage to an eccentric cam, serving to cause forward and reverse movements of the supporting surface 320 of the lower system in the manner described with respect to FIGS. 1 and 2. A further linkage system comprising arm 345 driven by the same eccentric cam as arm 330, connecting rod 347 and arm 349, serves to cause forward and reverse movement of arm 351 connected to the supporting surface 320 of the upper advancing system. In this manner, both the advancing and selecting means of the upper and lower systems operate in unison.

The selecting and advancing means of the lower system operates to supply a predetermined number of aligned commodities to a sheet wrapper in a manner identical to that described with respect to the apparatus of FIGS. 1 and 2. The selecting and advancing means of the upper system operates in conjunction with several additional components, now to be described. A supporting surface defined by a pair of horizontal support plates 353 and 353a are mounted in the same plane as conveyor 202 of the upper system, and in operative relationship to the supporting plate 328 thereof. Plates 353 and 353a are displaceable by means of piston assemblies 355 and 355a, each connected to the plates through connecting plates 357 and 357a, and operate along guides 359 and 359a. Plates 353 and 353a thus serve as removable retaining and supporting means for receiving and supporting a predetermined number of selected commodities by the upper selecting and advancing system.

Operating in conjunction with receiving and supporting plates 353 are various components for taking control of an aligned array of commodities of the plates 353 and 353a, and for placing the array into operative relationship into second receiving and retaining means. The first means for taking control of the array comprises in this embodiment a plurality of suction cups 361, mounted on supporting head 353, each suction cup being adapted to take control of an individual commodity of the aligned array. Supporting head 353 is mounted by means of supports 365 and 367 to a pair of vertically aligned guides 369 whereby the supporting head is movable in a vertical direction. Movement is caused by a piston assembly indicated by reference numeral 371 connected to the supporting head 363. Suitable means for creating suction to the suction cups 361 is also provided.

The second receiving and supporting means comprises a pair of spaced-apart supporting surfaces 373 and 373a, spaced vertically below and aligned with supporting surfaces 353 and 353a. Plates 373 and 373a are movable by means of piston assemblies 375 and 375a connected to the supporting plates through connecting plates 377 and 377a and operating on guides 379 and 379a. Thus, supporting plates 373 and 373a are separable, whereby a commodity placed thereon may be lowered in juxtaposition to an array of commodities advanced by the selecting and advancing means of the lower feeding system onto a wrapper blank in the manner described with respect to FIGS. 1 and 2, by actuating piston assemblies 375 and 375a to remove the supporting plates and permit the array to drop down onto the array advanced by the lower feeding assembly located on the wrapper at the upper station.

Referring now to FIGS. 6 to 8 in conjunction with the apparatus shown in FIG. 3, the commodity-selecting and advancing means of the upper and lower systems is shown in the various stages of operation. In FIG. 3, the commodity-advancing and selecting means is shown at the position it assumes at the beginning of a cycle in the operation of selecting and advancing a pedetermined number of commodities—i.e. the commodity-engaging fingers 322 supported by supports 320, are in a position whereby upon rotation of an eccentric cam of the central drive system and movement thereby of arm 342, rod 332 will cause supporting surface 320 to move downwardly and thus select a predetermined number of commodities in each of the guide channels defined by guides 216 to assume the position shown in FIG. 6.

The central drive system operating arms 345, 349 and 351, will then cause the fingers engaging the commodities to advance the selected number of commodities the desired length to place the commodities on supporting surface 353 and onto wrapper blank W, as shown in FIG. 7. In a subsequent operation, rods 332 and 332' will cause supporting surface 320 to rise at the end of the stroke as shown in FIG. 8, while arm 351 then moves the supporting surface 320 back to the initial position, as shown in FIG. 5.

At the time of forward movement of the supporting surfaces 320, supporting arms 324 with supporting surface 328 operating together in unison through connecting rod 329, are lowered from their raised position (as shown in FIG. 3) to a vertical position (as shown in FIGS. 6 and 7) thus permitting the commodities to be advanced onto the supporting surface 353 and the wrapper blank W, and thus lowering the barrier means which prevented the commodities from advancing on the conveyor 202 prematurely. As will be seen in FIGS. 3 and 7, the supporting surfaces 328 of the lower feed system also serves to hold down one side edge of the wrapper W in order to permit the commodities to easily slide onto the wrapper.

As will be seen in FIGS. 6 to 8, and for the purposes of "starting up" the operation, an array of commodities is placed on the supporting plates 373 and 373a. Thus, while the upper and lower feed systems are advancing a predetermined number of commodities onto the supporting surfaces 353 and 353a, and the wrapper W, the commodity which was on supporting surfaces 373 and 373a is lowered into juxtaposition with the commodity placed on the wrapper W by piston assembly 375 and 375a being actuated to remove the supporting surface 373 and 373a from supporting the commodity thereon, whereby it is lowered and placed on top of the commodity on the wrapper W. Subsequently, the first commodity-placing means including suction cups 361 are lowered into juxtaposition with the commodity placed on closed supporting surfaces 353 and 353a, whereby they assume control of the commodity (as illustrated in FIG. 7) and piston assemblies 355 and 355a subsequently displace the surfaces 353 and 353a whereupon a first commodity-placing means lowers the commodity onto supporting surfaces 373 and 373a, which were returned to a commodity-supporting position by piston assembly 375 and 375a after placing a commodity in juxtaposition with the commodity on the wrapper W advanced by the lower feed system.

The operation of the single-feed system illustrated in FIGS. 1 and 2 is carried out in a similar manner as that described above, with the exception that there is no feeding to an intermediate platform, but rather, the single-feed system merely advances a commodity directly onto the wrapper W.

The central control and drive system of the apparatus will now be described with particular reference to FIG. 9. This central control system operates various components of the apparatus of this invention in timed intermittent sequence.

The electric motor 270 rotates, in a previously described manner, the main drive shaft 238 by rotating bevel gear 296. Mounted on shaft 238 are a plurality of eccentric cams. One of these cams, 407, moves pusher arm 404, which in turn is pivotally mounted to rod 402 rigidly connected to a crossmember 406. Crossmember 406 in turn is connected to sliding rod 156 of the commodity advancing assembly at the lower station. As shown in FIG. 9, the commodity-advancing assembly preferably comprises two spaced-apart slidable piston rods whereby connecting rod 406 operates both in unison through a forward and return stroke.

The elevator platform 138, as previously mentioned, is lowered and raised in the downward and upward return stroke, by means of arm 246 connecting to the elevator platform by linkage 248. Arm 246 is moved by an eccentric cam 408 journaled on the shaft 238.

The means for selecting and advancing a predetermined number of commodities on the conveyor belts, previously described are actuated by means of arms 330 and 351 being moved by an eccentric cam 410 mounted on the shaft 238. As will be seen in FIG. 9, there are two sets of arms 330 and 351 on either side of the apparatus, which operate in unison through connecting shaft 345 when rotated by eccentric cam 410.

The barrier gates 328 are actuated by means of a further eccentric cam journaled on shaft 238, serving to move the arm 332.

In the above manner, the various components can be operated in the desired sequence according to the cam configurations.

The apparatus of this invention may include means for halting operation of the various components. To this end, as shown in FIGS. 5 to 8, a piston assembly 416 operating an arm 418 containing an opening 420 therein is adapted to engage arm 342 whereby the cam 412 will halt operation of the barrier gates 328.

Figure 10:
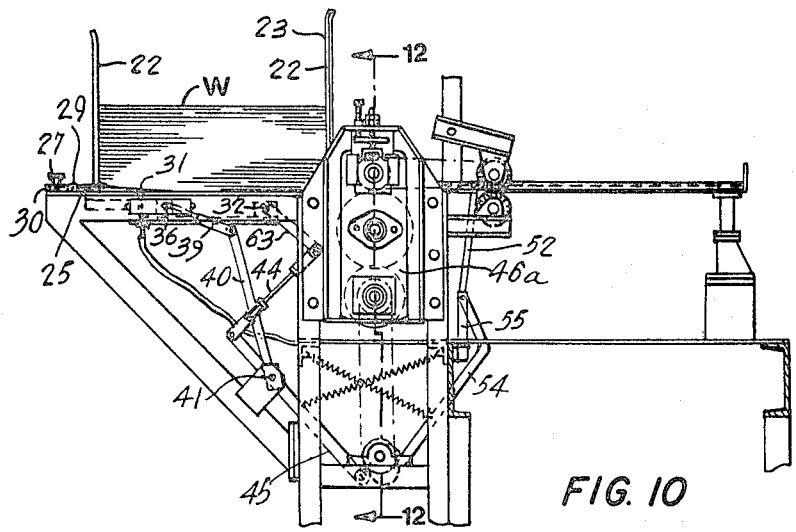
FIG. 10 is a side elevation of the wrapper storage and feeding system.
Figure 18:
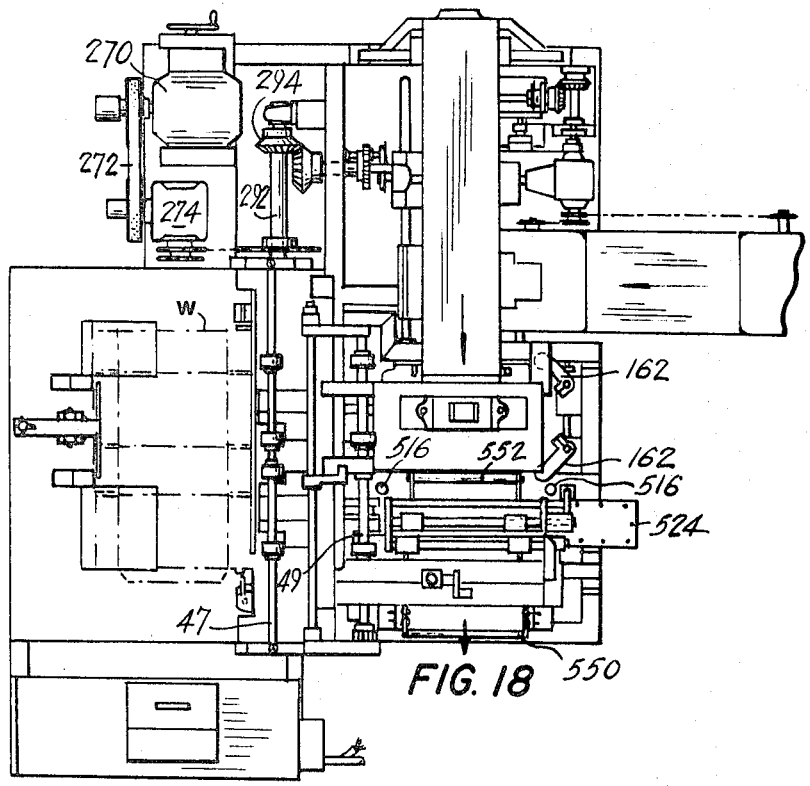
Figure 19:
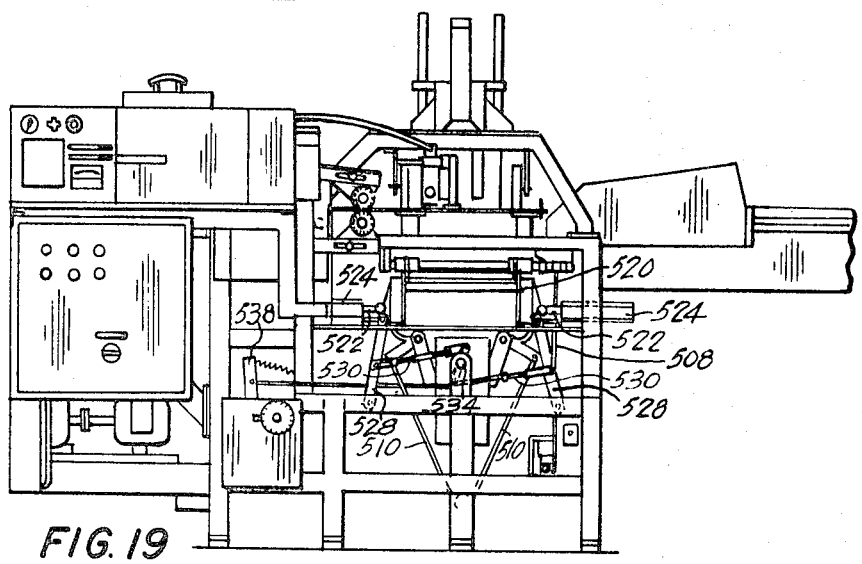
FIG. 19 is an end elevational view of FIG. 18.
Figure 24:
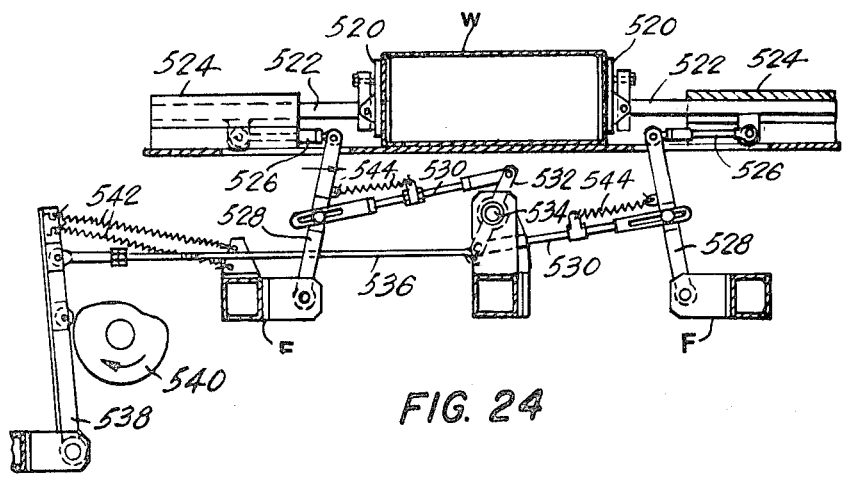
FIG. 24 is a section taken along the line 24—24 of FIG. 21.

Referring now to a further drive system included in the apparatus, and shown more particularly in FIGS. 10 and 12, there is provided a rotatable shaft 422 driven by a chain 424, which rotates about sprockets 426 and 428. Sprocket 428 is connected to a shaft driven by the central drive system previously described. Shaft 422 is supported by a bracket 430 connected to a frame member F. Shaft 422 mounts a plurality of eccentric cams indicated by reference numerals 432, 434 and 436, of which eccentric cam 432 is operatively connected to lever 45. Likewise, lever 54 is operatively connected to lever 45. Likewise, lever 54 is operatively connected to eccentric cam 434 and lever 42 to eccentric cam 436. Spring members 438 and 440 connected to one end to frame members and at the other to shafts 45 and 54, retain the shafts in contact with the eccentric cams.

Referring now to FIGS. 18 to 25, there is illustrated an alternate glue-applying system which may be used. In these figures, like reference numerals have been used to describe like parts and components, which were illustrated in previous figures.

The glue system is essentially a "hot melt" glue system, employing three main components operating in conjunction with each other. These components are generally designated by reference numeral 502 indicating a spray nozzle system, means indicated by reference numeral 504 adapted to retain the bottom pair of opposed flaps extending from the bottom panel of a wrapper upwardly sufficiently to retain previously folded wrapper flaps in juxtaposition with the commodity and for presenting them to the glue system and folding means 506 adapted to close certain panels of the wrapper after the glue has been applied.

In the embodiment now to be described, the glue-applying apparatus previously described is not included. All of the other operations and components are substantially the same until the elevator platform lowers the commodity on the wrapper to the lower station. In the alternate form of the apparatus, a pair of spaced-apart transverse side fingers 504 are mounted on either transverse side of the elevator platform at the lower station, spaced a slight distance thereabove. These fingers 506 are connected by connecting members 507 to a rotatable rod 508, mounted at one end by bushing 509 to frame member F. Rod 508 is rotatable to move fingers 506 inwardly and upwardly, by means of a movable arm 510 connected to the rod 508 via connecting arm 411. The movable arm 510, on each side of the elevator platform, is connected to a movable arm 512 at one end, while arm 512 at the other end is in contact with an eccentric cam 514 rotated by suitable means. Rotation of the cam 514 will cause upward and downward movement of the arm 512, in turn moving the fingers 506. Arm 512 has connected thereto a pair of springs 515 attached to a frame member F, for retaining the arm 512 in contact with the eccentric cam 514.

As will be seen in FIG. 21, the fingers 506 are normally resting a distance spaced above the lower station in order to retain the extending portions of the bottom wrapper panel at an angle sufficient to retain the previously juxtaposed transverse side panels in position to the commodity.

Figure 25:
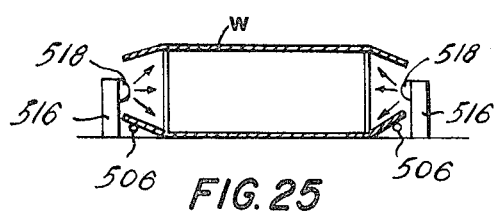
FIG. 25 is a schematic view showing the operation of the alternate glue system.

The glue-spraying apparatus is shown in greater detail in FIG. 25 and includes a support 516 on each transverse side of the lower station. Each support 516 mounts a glue spray nozzle 518 adapted to spray glue to the inwardly folded flaps emanating from the lateral transverse side wrapper panels as the commodity is advanced by the advancing means located at the lower station.

As will be seen in FIG. 25, the fingers 506 support the portions of the wrapper extending transversely from the bottom wrapper panel at an angle to the bottom panel, whereby the upwardly folded wrapper portions retain the previously folded transverse side wrapper portions. In this manner, the nozzles 518 will spray glue to the juxtaposed transverse side wrapper portions as shown by the arrows in FIG. 25.

Any suitable supply means for supplying glue to the spray nozzles 518 may be incorporated.

After glue has been applied to the transverse side flaps, the bottom and top portions of the wrapper extending from the bottom and top areas of wrapper are then juxtaposed to the transverse sides of the commodity to seal and enclose the commodity. To this end, there is provided a pair of opposed transverse movable closing plates comprising vertical abutting surfaces 520 connected to a movable rod 522, reciprocating in housing 524. Rod 522 is connected to a slidable arm 526 which in turn is pivotally connected to arm 528. Arm 528 is pivotally connected at one end to a frame member F. Each arm 528 is connected to a movable arm 530 and both are joined to a common connecting arm 532 rotatably mounted on a shaft 534. One end of connecting arm 532 is pivotally attached to movable arm 536, which is reciprocated by connecting arm 538 being in contact with eccentric cam 540. Springs 542 retain connecting arm 538 in contact with the eccentric cam, while springs 544 maintain arm 528 in positive relationship to arms 530.

The rotation of the cam 540, by suitable means, is carried out in timed sequence to the advancing of a commodity at the lower station whereby arm 522 carrying plates 520 closes the transverse side flaps into sealing relationship with the previously closed flaps. The fingers 506, actuated in the previously described manner, also aid in inwardly folding the remaining transverse side panels into juxtaposition with the previously folded transverse side panels.

In the above description, the fingers 506 have been described as being movable. This may not be required in all applications to which this apparatus is applicable and accordingly, the fingers 506 may be mounted in any stationary manner on the lower platform.

In FIGS. 21 and 22, a further component is illustrated, for the purpose of folding down the top wrapper panel into juxtaposition with the commodity and for closing the manufacturer's flap connected to the top panel. Specifically, this component includes a pair of movable arms 546 and 548, each mounting at one end a pair of rollers 550 and 552. The other end of the arms 546 and 548 are connected to shafts 554 and 556 respectively. Shaft 554 is rotatable by means of connecting arms 560 and 558, while shaft 556 is rotatable by means of connecting arms 562 and 564. Arm 558 is connected to arm 566, which in turn, is mounted on shaft 568. Arm 564 is connected to a further arm 570, which is also mounted on shaft 568.

Means for causing movement of the arms 558 and 564 and hence movement of the arms 546 and 548 comprises a pair of rods 572 and 576, each connected to a further arm 574 and 578 respectively, which in turn, are connected to the arms 558 and 564. Rods 572 and 576 at one end are in operative relationship to a pair of eccentric cams 580 and 582 mounted on a shaft 584 rotated by suitable means. Specifically, rods 572 and 576 are connected to an arm 586 and held in relationship thereto by means of springs 588.

It will be understood that various modifications can be made to the specific embodiments of the invention without departing from the spirit and scope thereof.

We claim:

1. A wrapping apparatus having a wrapper-storage area, selecting and feeding means for individually selecting and feeding a flat one-piece wrapper from the storage area, a downwardly movable elevator platform for receiving a flat wrapper, drive means for positively lowering the elevator platform, commodity-feeding means for presenting and placing on the flat wrapper on the elevator platform a commodity to be wrapped, said commodity-feeding means comprising first advancing means for advancing a plurality of commodities, means for aligning said commodities, while advancing, into predetermined alignment, selecting means for selecting a predetermined number of aligned commodities, second advancing means for advancing the selected commodities and presenting said commodities to said elevator platform, said second advancing means advancing said commodities to said platform at a rate faster than the advancement of said commodities by said first advancing means, preventing for preventing unselected commodities from advancing to said platform when said second advancing means is advancing said selected commodities, wrapper-engaging means for juxtaposing opposed side portions of the wrapper between upper and lower stations through which the elevator platform downwardly moves whereby one pair of opposed side portions of the wrapper are juxtaposed to the commodity when it reaches the lower station, second wrapper-engaging means to inwardly fold against the transverse sides of the commodity-wrapper portions extending from the lateral side wrapper panels, third wrapper engaging means to inwardly fold the bottom portion of wrapper sections extending from the bottom of the wrapper to upwardly fold them thereby to retain the minor portions juxtaposed to the transverse side of the commodity, further wrapper-folding means in advance of the lower station for juxtaposing the top panel of the wrapper to the commodity, advancing means for acting on the wrapper for advancing the partially wrapped commodity to said last-mentioned wrapper-folding means, and means for folding top panel sections extending from the top portion of the wrapper to the transverse sides of the commodity and to close the commodity in a fully wrapped manner.

2. A wrapping apparatus having a wrapper-storage area, selecting and feeding means individually selecting and feeding a flat one-piece wrapper from the storage area, said wrapper having a bottom panel, lateral side panels on either side of said bottom panel, and a top panel connected to one lateral side panel, with opposed pairs of attached panels connected to each side of said bottom lateral and top panels, a downwardly movable elevator platform for receiving said flat wrapper, glue-applying means for applying glue to said opposed pairs of said side panels as said wrapper is advanced from said storage area to said elevator platform, drive means for positively lowering the elevator platform, commodity-feeding means for presenting and placing on the flat wrapper on the elevator platform a commodity to be wrapped, said commodity-feeding means comprising first advancing means for advancing a plurality of commodities, means for aligning said commodities, while advancing, into predetermined alignment, selecting means for selecting a predetermined number of aligned commodities, second advancing means for advancing the selected commodities and presenting said commodities to said elevator platform, said second advancing means advancing said commodities to said platform at a rate faster than the advancement of said commodities by said first advancing means, means for preventing unselected commodities from advancing to said platform when said second advancing means is advancing said selected commodities, wrapper-engaging means for juxtaposing opposed side portions of the wrapper between upper and lower stations through which the elevator platform downwardly moves whereby the lateral upper panels of the wrapper are juxtaposed to the commodity when it reaches the lower station, second wrapper-engaging means to inwardly fold against the transverse sides of the commodity-wrapper portions extending from the lateral side wrapper panels, third wrapper-engaging means to inwardly fold the bottom portions of wrapper sections extending from the bottom of the wrapper to upwardly fold them thereby to retain the minor portions juxtaposed to the transverse side of the commodity, further wrapper-folding means in advance of the lower station for juxtaposing the top panel of the wrapper to the commodity, advancing means for acting on the wrapper for advancing the partially wrapped commodity to said last-mentioned wrapper-folding means, and means for folding top panel sections extending from the top portion of the wrapper to the transverse sides of the commodity and to close the commodity in a fully wrapped manner.

3. A wrapping apparatus having a wrapper-storage area, selecting and feeding means for individually selecting and feeding a flat one-piece wrapper from the storage area, said wrapper having a bottom panel, lateral side panels on either side of said bottom panel, and a top panel connected to one lateral side panel, with opposed pairs of attached panels connected to each side of said bottom lateral and top panels, a downwardly movable elevator platform for receiving said flat wrapper, drive means for positively lowering the elevator platform, commodity-feeding means for presenting and placing on the flat wrapper on the elevator platform a commodity to be wrapped, said commodity-feeding means comprising first advancing means for advancing a plurality of commodities, means for aligning said commodities, while advancing, into predetermined alignment, selecting means for selecting a predetermine number of aligned commodities, second advancing means for advancing the selected commodities and presenting said commodities to said elevator platform, said second advancing means advancing said commodities to said platform at a rate faster than the advancement of said commodities by said first advancing means, means for preventing unselected commodities from advancing to said platform when said second advancing means is advancing said selected commodities, wrapper-engaging means for juxtaposing opposed side portions of the wrapper between upper and lower stations through which the elevator platform downwardly moves whereby the lateral upper panels of the wrapper are juxtaposed to the commodity when it reaches the lower station, second wrapper-engaging means to inwardly fold against the transverse sides of the commodity-wrapper portions extending from the lateral side wrapper panels, third wrapper-engaging means to inwardly fold the bottom portions of wrapper sections extending from the bottom of the wrapper to upwardly fold them thereby to retain the minor portions juxtaposed to the transverse side of the commodity, said third wrapper-engaging means leaving said bottom portions of wrapper sections extending outwardly, glue-applying means at said lower station for applying glue to said minor portions of wrapper material, further wrapper-folding means in advance of the lower station for juxtaposing the top panel of the wrapper to the commodity, advancing means for acting on the wrapper for advancing the partially wrapped commodity to said last-mentioned wrapper-folding means, and means for folding top panel sections extending from the top portion of the wrapper to the transverse sides of the commodity and to close the commodity in a fully wrapped manner.

4. An apparatus as defined in claim 2, wherein said wrapper-selecting and feeding means comprises first means for engaging the lowermost wrapper of a stack of wrappers in said storage area, said first means advancing a selected wrapper to second and third wrapper-advancing means, said second and third wrapper-advancing means engaging and controlling the advancement of said wrapper for advancing said wrapper to said elevator platform, and fourth wrapper-advancing means for advancing the wrapper into position on said elevator platform.

5. An apparatus, as defined in claim 2, wherein said glue-applying means comprises a pair of glue baths beneath said wrapper-storage area, glue-applying wheels rotatable in said baths, rotatable glue segments in contact with said wheels, means for rotating said glue-applying wheels and segments, said glue segments having glue-applying surfaces about a portion of the circumference thereof adapted to apply glue to a wrapper blank advanced by said wrapper-selecting and feeding means, and means for retaining said wrapper in contact with said glue segments as said wrapper is advanced.

6. An apparatus, as defined in claim 5, wherein said wrapper includes a manufacturer's flap, said glue-applying segments including means for applying glue to the wrapper along one lateral side panel thereof in the area to which the manufacturer's flap is adapted to be secured to.

7. An apparatus as defined in claim 3 wherein said third wrapper-engaging means comprises a wrapper-engaging bar spaced above said lower station whereby when said commodity is lowered on said elevator platform, said bar upwardly folds the bottom portions of wrapper sections extending from said bottom panel upwardly.

8. An apparatus, as defined in claim 2, wherein said second wrapping-engaging means comprises movable arms adapted to inwardly fold said transverse sides of the commodity-wrapper portions extending from the lateral side panels and means for actuating said arms as the elevator platform descends.

9. An apparatus as defined in claim 2, wherein said drive means for lowering the elevator platform, said commodity-feeding means and said advancing means for acting on the commodity are driven by a common drive system, said drive system comprising a rotatable shaft mounting a plurality of eccentric cams, means for rotating said rotatable shaft and connecting means connecting said drive means for lowering said elevator platform, and said commodity-feeding means to said eccentric cams.

10. An apparatus as defined in claim 2, wherein said commodity-feeding means comprises a pair os spaced-apart upper and lower commodity-feeding systems, each system being adapted to supply an array of commodities to the elevator platform, and including first advancing means for advancing a plurality of commodities toward said elevator platform, means for aligning a plurality of commodities into an aligned array while being advanced by advancing means, said lower system including second advancing and selecting means for selecting and feeding to said elevator platform, in the feeding direction of said first advancing means a predetermined number of the aligned array of commodities at a speed greater than the speed of advancement of the commodities by said first advancing means, said upper system including second advancing and selecting means for advancing and selecting, in the feeding direction of said first advancing means, a predetermined number of aligned array of commodities at a speed greater than the speed of advancement of said first advancing means, said upper and lower systems each including means for preventing unselected aligned commodities from advancing past the leading point at which said commodities were selected by said second means, first retaining and supporting means for receiving the selected advanced aligned array from said second means of said upper system, second retaining means for retaining and supporting a selected aligned array, said second retaining and supporting means being located in operative relationship to said first retaining and supporting means and to the point of advancement of an aligned array by said second advancing means of said lower system, first placing means for placing a selected aligned array from said first retaining and supporting means onto said second retaining and supporting means, second placing means for placing an aligned array from said second retaining and supporting means into juxtaposition with an array of commodities advanced by said second advancing means from said lower system, means for operating said second advancing means of said upper and lower systems in unison whereby said lower system advances a selected aligned array to said elevator platform and said second advancing means of said upper system advances a selected aligned array to said first supporting means, means for actuating said second placing means and said second advancing means of said lower system in unison whereby said second placing means places a selected aligned array from said second retaining means in juxtaposition with an advanced array from said second system, and means for operating said first placing means in conjunction with said second placing means whereby said first placing means places a selected aligned commodity from said first retaining means onto said second retaining means after said second placing means has removed an array therefrom.